United States Patent
Detweiler et al.

(10) Patent No.: US 7,064,819 B2
(45) Date of Patent: *Jun. 20, 2006

(54) VERSATILE TRANSMITTER AND RECEIVER FOR POSITION MEASUREMENT

(75) Inventors: Philip L. Detweiler, Tipp City, OH (US); James E. Denney, Springfield, OH (US); Jonathan A. Jackson, Centerville, OH (US); Frank B. Douglas, Tipp City, OH (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/042,379

(22) Filed: Jan. 25, 2005

(65) Prior Publication Data

US 2005/0122507 A1    Jun. 9, 2005

Related U.S. Application Data

(63) Continuation of application No. 10/620,120, filed on Jul. 15, 2003, now Pat. No. 6,870,608, which is a continuation of application No. 10/302,081, filed on Nov. 22, 2002, now Pat. No. 6,643,004, which is a continuation of application No. 09/803,664, filed on Mar. 9, 2001, now abandoned.

(60) Provisional application No. 60/188,367, filed on Mar. 10, 2000.

(51) Int. Cl.
*G01B 11/26* (2006.01)
*G01C 1/00* (2006.01)

(52) U.S. Cl. ............... 356/141.1; 356/4.08; 356/141.4
(58) Field of Classification Search .............. 356/4.01, 356/4.08, 141.1, 141.4, 152.2
See application file for complete search history.

(56) References Cited

U.S. PATENT DOCUMENTS

| | | | |
|---|---|---|---|
| 3,588,249 A | 6/1971 | Studebaker |
| 3,885,314 A | 5/1975 | Banas, Sr. |
| 4,007,991 A | 2/1977 | Robertsson |
| 4,227,261 A | 10/1980 | Robertsson |
| 4,779,212 A | 10/1988 | Levy |
| 4,874,238 A | 10/1989 | Ochi et al. |
| 4,973,158 A | 11/1990 | Marsh |
| 5,100,229 A | 3/1992 | Lundberg et al. |
| 5,110,202 A | 5/1992 | Dornbusch et al. |
| 5,247,487 A | 9/1993 | Beliveau et al. |
| 5,294,970 A | 3/1994 | Dornbusch et al. |

(Continued)

FOREIGN PATENT DOCUMENTS

EP    1 195 615 A2    4/2002

*Primary Examiner*—Thomas H. Tarcza
*Assistant Examiner*—Isam Alsomiri
(74) *Attorney, Agent, or Firm*—Dinsmore & Shohl LLP

(57) ABSTRACT

Field-deployable spatial positioning or measurement systems are provided for improved versatility, reliability and performance. The spatial positioning or measurement systems use rotating laser fans or beams for positioning and measuring and include a system integrated field-deployable length standard that uses a reelable tape with positional indents. The systems further include the use of labyrinth seals at interface volumes between rotating laser heads and transmitter assemblies to prevent ingress of contaminants and allow for elimination of the use of rotary seals. Further, new dynamic leveling techniques are provided to plumb positional laser transmitter systems. Still further, strobe beam configurations are provided for improved near/far performance and a vertical mode sensing scheme that allows switching to measuring tall structures when needed.

14 Claims, 12 Drawing Sheets

U.S. PATENT DOCUMENTS

| | | |
|---|---|---|
| 5,461,473 A | 10/1995 | Pratt et al. |
| 5,513,000 A | 4/1996 | Smith et al. |
| 5,579,102 A | 11/1996 | Pratt et al. |
| 5,637,838 A | 6/1997 | Arey et al. |
| 5,689,330 A | 11/1997 | Gerard et al. |
| 6,011,613 A | 1/2000 | Ohtomo et al. |
| 6,198,528 B1 | 3/2001 | Maynard |
| 6,452,668 B1 | 9/2002 | Pratt |
| 6,535,282 B1 * | 3/2003 | Hedges et al. ............ 356/141.3 |
| 6,545,751 B1 | 4/2003 | Beliveau et al. |
| 6,643,004 B1 | 11/2003 | Detweiler et al. |
| 2002/0057426 A1 | 5/2002 | Ohtomo et al. |
| 2002/0060788 A1 | 5/2002 | Ohtomo et al. |
| 2002/0092978 A1 | 7/2002 | Ohtomo et al. |

* cited by examiner

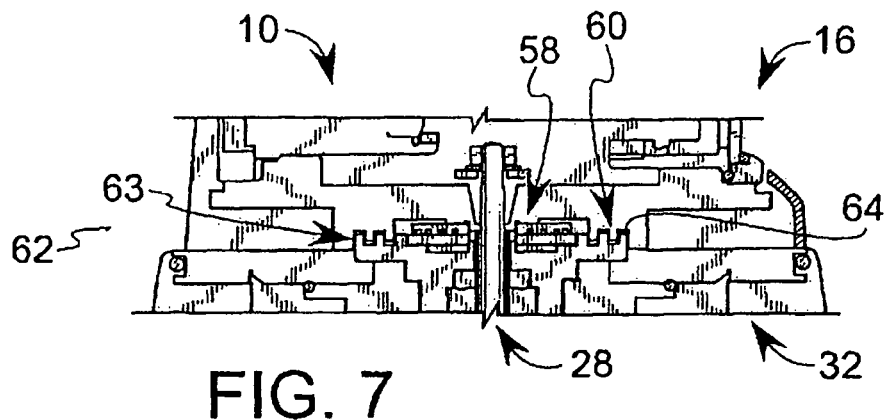
FIG. 7
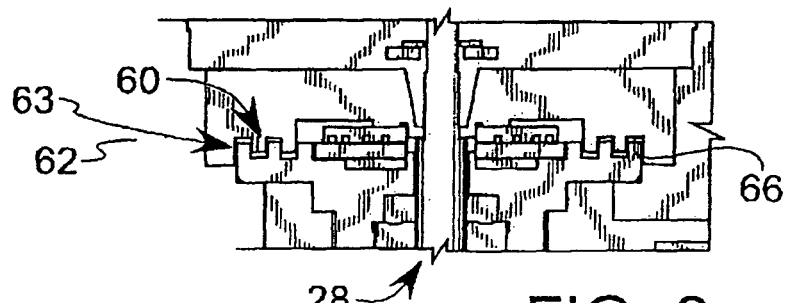
FIG. 8
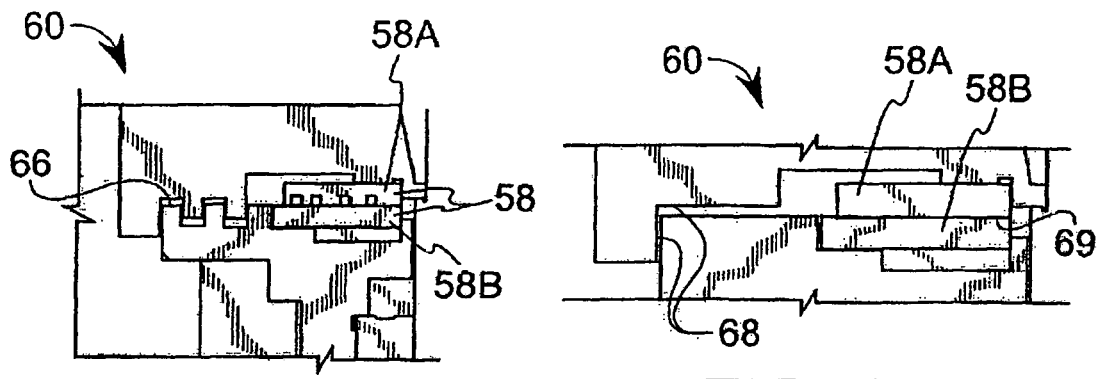
FIG. 9
FIG. 10
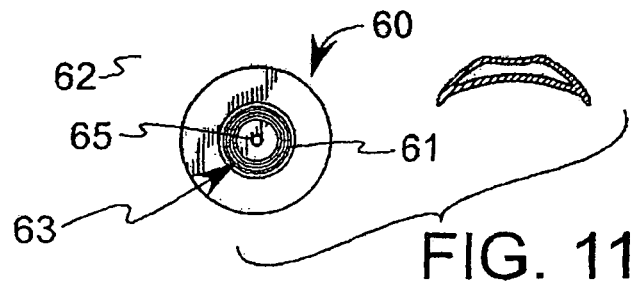
FIG. 11

VERSATILE TRANSMITTER AND RECEIVER FOR POSITION MEASUREMENT

CROSS REFERENCE TO RELATED APPLICATIONS

This application is a continuation of U.S. patent application Ser. No. 10/620,120 filed Jul. 15, 2003 now U.S. Pat. No. 6,870,608 which is a continuation of U.S. patent application Ser. No. 10/302,081, now U.S. Pat. No. 6,643,004, filed Nov. 22, 2002 now U.S. Pat. No. 6,643,004 and issued Nov. 4, 2003. This application is also a continuation of U.S. patent application Ser. No. 09/803,664 filed Mar. 09, 2001, now abandoned, which claims benefit of U.S. Provisional Application Ser. No. 60/188,367, filed Mar. 10, 2000.

This invention relates to field-deployable spatial positioning or measurement systems. Specifically, the present invention provides spatial positioning or measurement systems that use novel system hardware, calibration methods and transmission/detection modes to provide increased ease-of-use, better reliability, increased system longevity, easier calibration methods, wider usable range and improved versatility. As such, the spatial positioning or measurement systems according to the various embodiments of the present invention are capable of providing high resolution, reproducible and accurate spatial or position measurements in two or three dimensions thus allowing enhanced accuracy and utility for use in surveying and construction and manufacturing layout. The present invention may also be used for applications including spatial data generation for design of vehicular systems or vector and tensor mapping such as accumulating data relating to temperature, wind shear, electric fields, radiation flux, etc.

Present uses for field-deployable spatial positioning systems include construction layout such as setting reference points or setting control lines, asymptotes and similar geometric boundaries or guide lines; laying out parallel or perpendicular lines; measuring linear distances between points; navigating to specific points entered by a user; and establishing working planes. Such uses may include generation of level or sloped plane references for earthwork and site preparation; generation of vertical (plumb) plane references for tilt-up wall placement; and XY (2-D) or XYZ (3-D) coordinate measurement for positioning concrete forms, footers, and anchor bolts.

Additional uses for field-deployable spatial positioning systems include machine control or robotic applications, and transfer of measurement or spatial positioning data to and from CAD systems or databases.

Prior art field-deployable spatial positioning and measurement systems include those described in U.S. Pat. Nos. 4,874,238; 5,100,229; 5,110,202; 5,579,102; 5,461,473; 5,294,970; and 5,247,487, all of which are hereby incorporated by reference in their entirety. Spatial positioning systems described in these patent references usually comprise a single "laser transmitter" and a single "laser receiver". The transmitter is placed at a fixed location and serves as a measurement reference or beacon for the receiver. The handheld receiver is carried by the user and displays in real-time the location of the receiver relative to the transmitter. Because of mathematical constraints, such a single-transmitter system is only capable of measuring the horizontal (azimuth) and vertical (elevation) angular location of the receiver; that is, no direct measurement of the range from the transmitter to receiver is possible. A more advanced system consists of two or more transmitters and a single receiver. The transmitters are again placed at fixed locations, and serve the same purpose as before. The receiver calculates its azimuth and elevation location relative to each transmitter. If the transmitters are at known locations, the receiver can then calculate its position in 3-D space using known methods and algorithms, e.g., see U.S. Pat. No. 5,100,229 as cited above. In either the single or multi-transmitter systems, multiple receivers may be used simultaneously with the same transmitter(s). This is possible since the transmitters only serve as a reference or beacon, in the same way that GPS satellites serve as a reference for many users. Calculations to determine the location of a given receiver take place in that receiver, not the transmitter(s).

As will be described more fully below, the primary components of a transmitter can include the following: a rotary laser head containing two laser assemblies; a spindle assembly including a motor and encoder for spinning the rotary laser head; an optical strobe assembly that functions as an azimuth reference to establish a "zero" angle for the azimuth angle; a gimbal assembly including level sensors and motors for leveling the rotary laser head; and control electronics needed to perform various functions including sensing, balancing, monitoring, position determination, user interfacing and data output. The rotary laser head contains two laser assemblies that produce two fanned infrared laser beams perpendicular to the spin axis of the head as described in the above-reference U.S. patents. The radial axes of the fan beams can be chosen to be separated by approximately 90 degrees (or other angle) around the head. The fan beams are also rotated approximately 30 degrees in opposite directions about their respective radial axes.

The rotating laser head is attached to the top end of a shaft through the spindle assembly. The lower end of the shaft is attached to a motor and rotary encoder. The motor spins the shaft, and thus the head at a known constant speed. The rotary encoder is used to sense the rotation speed of the shaft and provides feedback to the motor drive circuit in the control electronics.

As is described in the above-reference U.S. patents, an optical strobe assembly can be used to synchronize, or set a rotation datum for, the azimuthal angle swept by the fanned beams. This can be implemented as a ring of outward-facing IREDs (infrared emitting diodes) located just below the rotating laser head. The strobe is stationary, and mounted to the outside of the spindle assembly. Using feedback from the rotary encoder on the shaft, the control electronics cause the strobe to emit a very short flash of infrared light once per revolution of the head, or any other set interval. This flash is detected by the mobile receiver and used as a zero azimuth angle reference.

The gimbal assembly is attached to the outside of the spindle assembly, and connects it to the outer housing of the transmitter. The purpose of the gimbal assembly is to allow a tilt (in two axes) in a known manner of the rotary head spin axis relative to the outer housing. In most applications it is desirable, for reasons to be explained below, to plumb the spin axis of the head with respect to gravity (or to some other desired axis). If this is done, the radial axes of the fan lasers, which are perpendicular to the spin axis, will sweep through a plane that is level with respect to gravity. In order to plumb the spin axis, the control electronics reads the output of the level sensors, which are attached to the outside of the spindle assembly, and drives the motors of the gimbal assembly until the sensor outputs indicate that the spin axis is plumb. Well known electrolytic vials can be used as monitors in assisting this feedback function.

Control electronics govern the overall operation of the laser transmitter. As mentioned above, the electronics control the rotation speed of the head by using the rotary encoder output as feedback. The electronics further trigger the optical strobe once per revolution of the head and plumbs the spin axis by moving the gimbal assembly based on feedback from the level sensors.

The primary components of the receiver generally include the following: a detector such as a (photodiode) assembly for sensing the optical strobe and fan lasers from the transmitter(s); timing electronics for measuring the time between received pulses; a processor, such as a microprocessor, for calculating the location of the receiver; and a user interface such as a display and keypad. The detector or photodiode assembly produces an electrical output in response to the optical strobe signal from the transmitter(s). The detector or photodiode assembly also produces an output pulse whenever crossed by one of the rotating fan beams from a transmitter. For example, when the detector is in the vicinity of a single transmitter, the output for one complete rotation of the transmitter head can include times T1, T2, and Trev measured by timing electronics, where T1 is the time between a (received) strobe light pulse and a first fanned laser beam; T2 is the time between a strobe light pulse and a second fanned laser beam; and Trev is the time between strobe pulses.

The microprocessor calculates the angular location of the receiver relative to the transmitter by using the output of the timing electronics. Since the strobe is omnidirectional, the absolute time at which the strobe pulse is received is independent of the position of the receiver. The two fan beams projected from the transmitter are tipped 30 degrees in opposite directions about their radial axes, which are separated by 90 degrees about the rotating laser head. Therefore the elevation (vertical) angle of the receiver relative to the transmitter will be a function of the time between the received laser pulses, and the azimuth (horizontal) angle will be a function of the average time from the strobe to the two laser pulses as given, for example, in U.S. Pat. No. 5,110,202 cited above. If the speed of rotation of the transmitter head is very steady, the angular position of the receiver may be calculated as:

$$\text{azimuth angle} = 360 * (T1 + T2)/(2 * \text{Trev}) \qquad \text{Eqn. 1}$$

$$\text{elevation angle} = \frac{360 * (T1 + T2)/\text{Trev} - 90}{2} * \cot(30) \qquad \text{Eqn. 2}$$

The result of these calculations is output in various formats on the display, depending on the particular application. The keypad allows the user to control the operating mode.

One aspect of such a spatial positioning system is the use of a length standard to set a scale for the spatial positioning system because the above scheme often measures the azimuthal and elevation angles only, depending on the number of transmitters and the system functions selected. With a single detector and transmitter, for example, the distance between the two is unknown. One method of estimating the distance is to perform a "stadia measurement", which is a common technique in surveying. This measurement can be performed with two detectors (such as photodiodes) mounted to a straight rod a known distance apart (e.g., 2 meters). Both detectors would be connected to the same receiver, which would then simultaneously calculate the angular position of each detector relative to the transmitter. Since the distance between the detectors is known, the receiver can make a relatively crude estimate of the distance from the rod to the transmitter. This method is suitable if highly accurate measurements are not required, but suffers from parallax type error, especially over long ranges in the field of measurement.

If more accuracy is required, a multi-transmitter system may be used. This system is capable of calculating accurate 2-dimensional or 3-dimensional positions of a single-detector receiver. The basic measurement is the same as in the single-transmitter system; that is, the receiver calculates its angular location relative to each transmitter. Mathematically, the location of the receiver relative to a given transmitter is somewhere along a vector that starts at the transmitter and passes through the receiver. If the transmitters are at known locations, then solving for the intersection of the vectors extending from each transmitter to the receiver will give coordinates of the receiver. More precisely, the coordinates found are at the center of the detector or photodiode.

However, for systems using only one transmitter or for systems using multiple transmitters where increased accuracy and resolution is desired, a scaling reference is needed. One usually introduces a linear scale or distance reference into a known setup procedure for this purpose. Since the basic measurements made are all angular, and the transmitters and setup points are at arbitrary locations, inherent scale in the system can be obtained by several means. For example, a scale bar or tape measure can be used. When, for example, the user measures a point at each end of an object that is exactly one meter long and the receiver is told that the distance between these points is one meter; then the receiver can adjust the scale of the relative coordinate system to give measurements in meaningful units such as meters, inches, feet, etc. The measurement of this scale reference object must be done very accurately, since the operating distance multiplies any error in the scale reference. That is, if a 1 mm error is made in measuring a 1 m scale reference, then the absolute position error at a distance of 50 m is 50 mm. Therefore it is desirable to use long scale references, such as a 10 meter scale reference.

A second aspect for such a spatial positioning system, particularly if it is to be field-deployable, is that contaminants are kept out of certain critical areas containing vital components like the spindle shaft and shaft bearings.

A third aspect for the spatial positioning system is the desirability of a leveled transmitter to enhance the accuracy of the measurements that are made. With the automatic leveling described above, there is still a need for frequent and continued calibration of such leveling in the transmitter units. This calibration is vital for accuracy and usability. From the outset, initial manufacturing tolerances must be set before new transmitters are sold. Transmitters that are dropped, or subject to excessive mechanical vibration should preferably be re-calibrated, and six month periodic calibration are usually recommended and expected. Calibrations are also often required after removal and replacement of mechanical components such as the rotating laser head or spindle assembly. Finally, preparation and certification of a used transmitter for sale would require close calibration of the auto-leveling system.

A fourth aspect of such a spatial positioning system is that the output light or energy from the strobes used to synchronize the azimuthal fan sweep should preferably cover the field of measurement and be of sufficient strength to be detected without ambiguity and with a high enough signal to noise ratio in the control or sensing electronics.

A fifth aspect of such a spatial positioning system is that fiduciary volume over which the transmitter-receiver combination can function should preferably cover the desired field of measurement, such as when doing spatial positioning of tall or high structures.

In the prior art, there are problems associated with each of these requirements.

The first aspect of setting a scale is made difficult by having to measure a ruler, tape, or other reference in the field. Accuracy can suffer, as noted above, due to measurement errors. Reproducibility can suffer from using different length standards, or using the same standard, but with slightly different deployment, such as when a tape measure is not pulled to the same tightness from measurement to measurement.

The second aspect for keeping contaminants out of selected areas or away from critical components in the transmitter has not been adequately addressed. Typically one uses rotary seals, which introduce friction associated with spinning the rotating laser head. This added friction can reduce battery life in the transmitter. Rotary seals also introduce vibrations and shaft wobble, that, while subtle, can affect accuracy and reproducibility for coordinate measurements, especially over a large field of measurement. Degradation of such rotary seals can reduce system longevity and can send bits of elastomer or other debris into the protected areas, and can release trapped dirt as well.

The third aspect for a calibration of the automatic leveling in a transmitter is quite onerous, and requires use of known elaborate procedures using measurement stands, sensors, and the like. Such present calibrations are very time consuming, and require the laser output to be painstakingly and manually compared to benchmarks and references in a setup stand. This can take hours per unit, and drives up costs. Careful work is required, and setup errors are not well tolerated, resulting in overall calibration errors.

The fourth aspect for strobe or synchronization distribution suffers from severe tradeoffs in usable range and signal strength. Light emitting devices that have narrow solid-angle output distributions that are suitable for long distance "reaching" of the strobe beam to far locations in the field of measurement are inadequate for measurements close to the transmitter, especially down low or up high. Conversely, light emitting devices that have wide solid-angle output distributions that are suitable for good wide coverage of measurement very close to the transmitter are inadequate for measurements far from the transmitter, because their output intensity drops rapidly as a function of distance from the strobe.

The fifth aspect of keeping a large usable range for vertical types of measurements cannot be addressed with present fanned beam transmitters because the divergence or extent of the fan beams used are not sufficient to cover the entire field of measurement, and can suffer from "fringe" effects where the crispness or quality of the beam fans degrades at large divergence angles. When the usable range of measurement over the field of measurement suffers because the working space or fiduciary volume subtended by the capabilities of spatial positioning system operation is limited, such as when working in the vertically extended environments, the system cannot be used. Such conditions come up often, such as when tilting pre-fabricated walls to a vertical position. Conventional spatial positioning systems cannot span the necessary vertical fiduciary volume over which accurate measurements must be made, unless a transmitter dedicated to laser sweeps in a vertical plane is used.

It is therefore an object of this invention to provide a field-deployable length standard that is built into the spatial positioning system receiver with capability to reproduce faithfully the force loading of the length standard for greater accuracy. It is also an object to provide protection against contaminant entry without the use of rotary seals or other conventional means used in the spatial positioning system field that have not met with great success without the drawbacks mentioned. It is a further object of this invention to provide a method of calibration the leveling of a transmitter which is easy to implement, accurate, and tolerant of setup errors. It is yet a further object of this invention to provide a scheme for synchronization strobe beam distribution which maximizes usable range for both near and far measurements with respect to the transmitter. It is another object of this invention to provide a way to use the same transmitter for vertical types of measurements, while allowing use of the same control electronics and calibration procedures as cited in the third requirement above. Other objects will become apparent upon reading of the specification.

SUMMARY OF THE INVENTION

One general embodiment disclosed includes a transmitter and spatial positioning receiver for a spatial positioning system. The transmitter comprises a stationary portion and a rotating laser head in proximity to the stationary portion. The rotating laser head comprises a first light emitting device operatively configured to emit a divergent rotating light fan onto a field of measurement. The transmitter also comprises a synchronization strobe operatively configured to provide a synchronization strobe beam. The spatial positioning receiver also includes a detector operatively configured to detect the divergent rotating light fan and also the synchronization strobe beam when the spatial positioning receiver is operating in the field of measurement. Additionally, the system also includes a processor programmably configured to determine at least one spatial coordinate of the detector in the spatial positioning receiver based on a time of receipt of at least one of the divergent rotating light fan and the synchronization strobe beam from the transmitter.

The transmitter and spatial positioning receiver also comprise a field-deployable length standard for use with the spatial positioning receiver for spatial position-marking, setting, calibrating or referencing in the spatial positioning system. This field-deployable length standard comprises a reelable tape comprising at least one markable position. The reelable tape and the markable position are each positioned and oriented with respect to the spatial positioning receiver such that when the spatial positioning receiver is moved from a first location to a second location and upon unreeling the reelable tape and using the markable position, a detector in the spatial positioning receiver is a known distance from the first location of the detector in the spatial positioning receiver prior to unreeling the reelable tape.

Additionally, the transmitter is so constructed so that the stationary portion and the rotating laser head are each individually positioned, shaped, and oriented such that there is defined an interface volume therebetween. The transmitter then further comprises a labyrinth seal, so sized, positioned and oriented so as to restrict the motion of contaminants through the interface volume between the rotating laser head and the stationary portion of the transmitter.

Additionally, there is found a strobe set to provide a spatial positioning transmitter synchronization strobe beam to improve energy distribution and operating range when communicating with the spatial positioning receiver operating in the field of measurement. The strobe set further comprises a first strobe having an output distribution of a first value for half power beam angular width, oriented to provide output onto the field of measurement. A second strobe is provided having an output distribution of a second value for half power beam width higher than the first value for half power beam angular width, oriented to provide output onto the field of measurement. The first and second strobes are further positioned and oriented such that the operating range of the spatial positioning receiver is increased with respect to the first and second strobes both having either the first value or the second value for half power beam angular width. The transmitter can also comprise a sensor to sense when the transmitter is oriented so as to sweep the divergent rotating light fan in a substantially vertical plane, with the sensor communicating the sense to the processor for a vertical coordinate determination.

Other embodiments of the inventions described herein will be described below, and individually, some embodiments have only some of the elements thus far cited. For example, we disclose a field-deployable length standard for use with a spatial positioning receiver for spatial position-marking, setting, calibrating or referencing in a spatial positioning system, the field-deployable length standard comprising a reelable tape comprising at least one markable position. The reelable tape and the markable position are each so positioned and oriented with respect to the spatial positioning receiver such that when the spatial positioning receiver is moved from a first location to a second location, and upon unreeling the reelable tape and using the markable position, a detector in the spatial positioning receiver is a known distance from the first location of the detector in the spatial positioning receiver prior to unreeling the reelable tape. Additionally, the markable position can comprise a detent operative upon the reelable tape.

Alternatively, the field deployable length standard can comprise a reelable tape reeled upon a reel assembly in mechanical communication with a housing. This reel assembly can optionally be under a spring bias with respect to the housing so as to allow movement of the reel assembly with respect to the housing. The spring bias can optionally allow for a desired force loading along the reelable tape. The housing can also comprise an aperture so shaped, sized, positioned, and oriented so as to allow a viewing of the movement of the reel assembly, with the viewing operative to allow a calibration of the force loading along the reelable tape. Alternatively, the aperture can comprise a lens so shaped, sized, positioned and oriented so as to allow viewing of the movement of the reel assembly, with the viewing through the lens operative to allow a similar calibration of the force loading along said reelable tape.

Another embodiment can comprise a field-deployable length standard for use with a spatial positioning receiver for spatial position-marking, setting, calibrating or referencing in a spatial positioning system, with the field-deployable length standard comprising a reelable tape in mechanical communication with the spatial positioning receiver. The reelable tape comprises a first markable position, and a second markable position a known path length along the reelable tape from the first markable position when the reelable tape is unreeled. The first and second markable positions can be so positioned and oriented with respect to the spatial positioning receiver when the reelable tape is unreeled such that when the spatial positioning receiver is posed to a first location upon unreeling the reelable tape and using the first markable position, a detector in the spatial positioning receiver is a known distance with respect to the detector when the spatial positioning receiver is posed to a second location upon unreeling the reelable tape and using the second markable position of the reelable tape. In turn, any of the first and second markable positions can comprise a detent operative upon the reelable tape. Optionally, the reelable tape for this embodiment can be reeled upon a reel assembly in mechanical communication with a housing.

Additionally, the reel assembly can be under an optional spring bias with respect to the housing so as to allow movement of the reel assembly with respect to the housing. Optionally, this spring bias can allow for a desired force loading along the reelable tape. And, as before, the housing can comprise an aperture so shaped, sized, positioned, and oriented so as to allow a viewing of the movement of the reel assembly, with the viewing operative to allow a calibration of the force loading along the reelable tape. Again, the aperture can optionally comprise a lens so shaped, sized, positioned and oriented so as to allow the viewing of the movement of the reel assembly, with the viewing again operative to allow a calibration of the force loading along the reelable tape.

Further embodiments include a transmitter for a spatial positioning system, with the transmitter having a stationary portion and a rotating laser head in proximity to the stationary portion, the stationary portion and the rotating laser head each individually positioned, shaped, and oriented such that there is defined an interface volume therebetween. The transmitter further comprises a labyrinth seal, so sized, positioned and oriented so as to restrict the motion of contaminants through the interface volume between the rotating laser head and the stationary portion of the transmitter. The labyrinth seal can optionally be so formed that a necessary path for any contaminants is serpentine, or, in the alternative, substantially straight. Optionally, the stationary portion and the rotating laser head can each be individually positioned, shaped, and oriented such that the labyrinth seal is formed by at least a portion of either or both of the stationary portion and the rotating laser head, with the labyrinth seal operative in the interface volume. Alternatively, the stationary portion and the rotating laser head can comprise a rotary transformer positioned proximate the interface volume where the rotary transformer is positioned, shaped, and oriented such that the labyrinth seal is formed by at least a portion of the rotary transformer, with the labyrinth seal again operative in the interface volume.

Also disclosed is a method for dynamic leveling of a rotating body to bring a rotational axis of the rotating body into better alignment with a desired axis. This is useful for maintaining functionality and accuracy of the rotating elements used in the systems described. The method comprises:

[a] Aligning an operating axis of an autocollimator to the desired axis, with the autocollimator designed to output a light ray along the operating axis, and the desired axis as a result of the aligning, and to monitor any reflected light rays from the light ray with respect to the desired axis;

[b] affixing a mirror to the rotating body;

[c] orienting the rotating body to within the field of view of the autocollimator;

[d] noting the position of the reflected light rays monitored by the autocollimator, whereby a circular arc is formed by the reflected light rays;

[e] determining the direction and magnitude of a deviation of a geometric center of the circular arc from the operating axis of the autocollimator;

[f] changing the orientation of the rotating body in such a manner so as to bring the rotational axis into better alignment with the operating axis of the autocollimator, whereby the rotational axis will be put into better alignment with the desired axis.

If desired, the desired axis can be a downward gravitational vector. As contemplated here, one can certainly make the rotating body be a rotating laser head in a spatial positioning system. Optionally, too, the mirror can be affixed to the rotating laser head in such a manner that a normal axis of the mirror is substantially parallel with the desired axis. Alternatively, the mirror can be affixed to the rotating laser head in such a manner that a normal axis of the mirror is within 90 degrees of the desired axis.

There is also disclosed a method for forming a spatial positioning transmitter synchronization strobe beam to improve energy distribution and operating range when communicating with a spatial positioning receiver operating in a field of measurement, the method comprising:

[a] arraying a first strobe having an output distribution of a first value for half power beam angular width onto the field of measurement;

[b] arraying a second strobe having an output distribution of a second value for half power beam width higher than the first value for half power beam angular width, onto the field of measurement;

[c] the first and second strobes further positioned and oriented such that the operating range of the spatial positioning receiver is increased with respect to the first and second strobes both having either the first value or the second value for half power beam angular width.

Optionally, the first value for half power angular beam width can be less than 15 degrees, and/or the second value for half power angular beam width can be more than 20 degrees. Also, a plurality of first strobes can be arrayed about a single second strobe, for output of the beam onto the field of measurement. Such a plurality can also be numerically three, as opposed to two or four. In another embodiment, the plurality of first strobes and a plurality of second strobes can be optionally arrayed in such a manner and orientation that each strobe of such first and second strobes is aimed at a distinct direction onto the field of measurement.

In the same vein, one can also optionally select a strobe set to provide a spatial positioning transmitter synchronization strobe beam to improve energy distribution and operating range when communicating with a spatial positioning receiver operating in a field of measurement, with the strobe set comprising a first strobe having an output distribution of a first value for half power beam angular width, oriented to provide output onto the field of measurement; a second strobe having an output distribution of a second value for half power beam width higher than the first value for half power beam angular width, oriented to provide output onto the field of measurement; with the first and second strobes further positioned and oriented such that the operating range of the spatial positioning receiver is increased with respect to the first and second strobes both having either the first value or the second value for half power beam angular width, which achieves one of many objectives sought in the instant teachings. Using this prescription, the first value for half power angular beam width can again be less than 15 degrees, and the second value for half power angular beam width can also be more than 20 degrees. Another embodiment allows that a plurality of first strobes are arrayed about a single second strobe, for output of the beam onto the field of measurement; optionally the plurality can be numerically three. Optionally, the plurality of first strobes and a plurality of second strobes are arrayed in such a manner and orientation that each strobe of such first and second strobes is aimed at a distinct direction onto the field of measurement.

Another embodiment of the instant teachings yields a transmitter and spatial positioning receiver for a spatial positioning system, with the system capable of switching from a horizontal mode to a vertical mode. That system comprises a stationary portion and a rotating laser head in proximity to the stationary portion, with the rotating laser head further comprising a first light emitting device emitting a divergent rotating light fan onto a field of measurement; a synchronization strobe providing a synchronization strobe beam for communicating with the spatial positioning receiver operating in the field of measurement; a detector in the spatial positioning receiver to detect the divergent rotating light fan and also the synchronization strobe beam; and a processor to determine at least one spatial coordinate of the detector in the spatial positioning receiver based on a time of receipt of the divergent rotating light fan and the synchronization strobe beam. The transmitter and spatial positioning receiver also comprise a sensor to sense when the transmitter is oriented so as to sweep the divergent rotating light fan in a substantially vertical plane, the sensor communicating this directionality or sense to the processor for a vertical coordinate determination.

Another embodiment includes various elements, such as a field-deployable spatial positioning transmitter and receiver for spatial position-marking, setting, calibrating or referencing, where the field-deployable spatial positioning transmitter and receiver comprise a transmitter kit comprising a rotating laser head emitting an angled fan of light, where angled can mean that the fan is neither orthogonal nor parallel to the plane through which the head rotates, and a strobe emitter that emits a light pulse in predetermined or programmed relation to the position of the laser head; a processor in data communication with a receiver; with the receiver adapted to be moved about a field of measurement and determine, in conjunction with the processor, distance and orientation. The receiver comprises a light detector, and the receiver determines distance and orientation to the transmitter based on the timing of detections of light from the fan of light and from the strobe.

The receiver can optionally further comprise a field-deployable length standard. Such a standard can comprise a reelable tape that in turn comprises at least one markable position and a reel attached to or incorporated within a housing for the receiver, the reelable tape and the markable position each so positioned and oriented with respect to the receiver such that when the receiver is posed at a first location and then, upon unreeling the reelable tape and using the markable position, a second location, the processor makes its calculations using light detections at the first location and second location, and a known distance provided by the reelable tape. The processor can optionally be attached to or incorporated within the receiver housing. Alternatively, the rotating laser head and strobe emitter can be incorporated into or attached to a common transmitter housing.

General embodiments include a transmitter for a spatial positioning system comprising a transmitter having a portion adapted to be stationary during operation and a rotating laser head mounted on the stationary portion; and a labyrinth seal between the rotating laser head and the stationary portion effective to restrict the motion of contaminants between the rotating laser head and the stationary portion.

Another embodiment includes method for forming a spatial positioning transmitter synchronization strobe beam to improve energy distribution and operating range when communicating with a spatial positioning receiver operating in a field of measurement, the method comprising:

operating a rotating a laser head emitting an angled fan of light periodically operating, in connection with defined rotations of the laser head, a first strobe having an output distribution of a first value for half power beam angular width onto the field of measurement; and periodically operating, in connection with defined rotations of the laser head, a second strobe having an output distribution of a second value for half power beam width higher than the first value for half power beam angular width, onto the field of measurement.

In kit form, another possible embodiment includes a spatial positioning system, with the system capable of switching between a horizontal and a vertical mode. This system comprises a transmitter kit and a receiver kit. The transmitter kit comprises a rotating laser head emitting an angled fan of light; a transmitter processor; a strobe emitter that emits a light pulse in predetermined or programmed relation to the position of the laser head; and a sensor to sense when a housing containing the rotating laser head is oriented so as to sweep in a substantially vertical plane and communicate this information to the transmitter processor. The receiver kit comprises a receiver processor in data communication with a receiver. The receiver processor can optionally be the same as the transmitter processor. The receiver is adapted to be moved about a field of operation and determine, in conjunction with the receiver processor, distance and orientation. The receiver comprises a light detector and is adapted such that the receiver determining distance and orientation to the transmitter are based on the timing of detections of light from the fan of light and from the strobe. The transmitter processor signals the receiver processor of the orientation or modulates the transmitter kit light emissions or rotation in a manner detectable by the receiver kit.

BRIEF DESCRIPTION OF THE DRAWINGS

FIG. 7 shows a cross-sectional exploded view of a portion of the transmitter of FIG. 1, showing use of a labyrinth seal at the interface between a stationary portion and a rotating laser head portion of the transmitter according to an embodiment of the present invention.

FIG. 8 shows a closer cross-sectional view of FIG. 7, showing use of a labyrinth seal.

FIG. 9 shows the left side portion of the cross-sectional view of FIG. 8, showing use of a labyrinth seal and a rotary transformer.

FIG. 10 shows a close view of the left side portion of the cross-sectional view of FIG. 9, according to an embodiment of the invention having non-serpentine labyrinth seals.

FIG. 11 shows an end-on surface view of the labyrinth seal shown in FIG. 7, in a plane perpendicular to a spindle shaft of the transmitter.

DEFINITIONS

Figure 1:
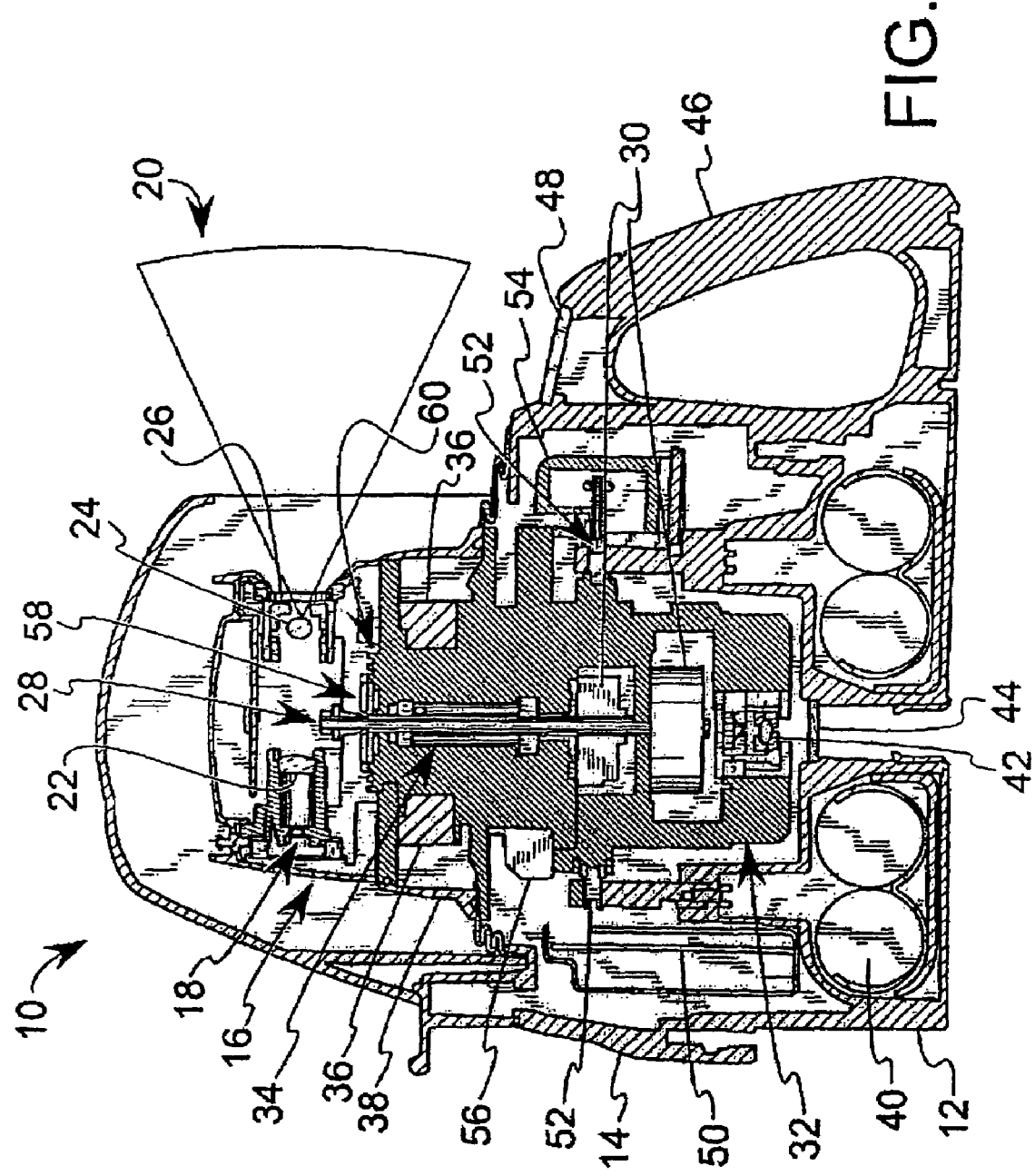
FIG. 1 shows a cross sectional schematic view of a transmitter according to an embodiment of the invention.

The following definitions shall be employed throughout:

Autocollimator shall include any optical instrument or technique that provides equivalent information to that given by a conventional autocollimator as known in the field of metrology, such as where a device uses a single lens to collimate diverging light from a slit, and then focuses the light on a exit slit after it has passed through a prism to a mirror and been reflected back through the prism. For this definition, any other device or thing, such as the interior of a 55 gallon drum, could be used as a projection surface for a light ray emitted by a plumbed device, such as an autocollimator. The term autocollimator automatically includes any and all such supplementary devices.

Azimuthal angle or azimuth shall be consistent with its definition in the field of surveying and shall refer to what is known mathematically as the polar angle theta in spherical polar coordinates (r, theta, phi). The azimuthal angle shall be the angle formed in the horizontal plane between the horizontal projection (or component of) a spatial vector to a spatial position, and an azimuthal reference vector. Corresponding rotations representing changes in the azimuthal angle shall occur through rotations about a vertical axis. (See elevation angle).

Circular arc(s) shall include complete circles as well as subset segments or arcs of any angular extent.

Contaminant shall include any material, material body, particle, gas, fluid, or compound deemed undesirable and for which restriction of movement is sought to prevent deleterious effect(s) on selected components.

Coordinate(s) shall not be limited to whatever spatial coordinate system(s) is/are used herein (e.g., spherical polar (r, theta, phi)), and shall be equivalent to and convertible to other coordinate systems, such as circular cylindrical (r, theta, z), rectangular Cartesian (x, y, z), elliptic cylindrical, parabolic cylindrical, bipolar, prolate spheroidal, oblate spheroidal, parabolic, toroidal, bispherical or other accepted coordinate systems, with or without added scaling factors or metrics used to tailor output information to a user's needs, e.g., aerodynamic studies over specific air foils, etc.

Detector shall include any device or devices that receive spatial position-specific information from a transmitter, whether from a light emitting device inside a rotating laser head, or a synchronization (strobe) pulse.

Elevation angle or elevation shall be consistent with its definition in the field of surveying and shall refer to what is known mathematically as the azimuthal angle phi in spherical polar coordinates (r, theta, phi), and not to be confused with the azimuthal angle from the field of surveying in the definition above. The elevation angle shall be the angle formed in the vertical plane between the vertical projection (or component of) a spatial vector to a spatial position, and a zero degree elevation reference vector determined by gravity. Corresponding rotations representing changes in the elevation angle shall occur through rotations about a horizontal axis. (See azimuthal angle).

Fan shall include divergent light or laser beams such as those described in U.S. Pat. Nos. 4,874,238 and 5,100,229.

Half power beam angular width (HPBW) shall be used here, including in the appended claims, as a mere illustration of one of many ways to characterize energy distribution as a function of solid angle (or other spatial parameters) from a strobe or light emitting device, and shall not be taken to be limiting as to other characterizations and distribution functions that can be used.

Labyrinth seal(s) shall include non-contact seals that serve to restrict motion of fluids and/or contaminants such as particulates by the use of surfaces in close proximity; such non-contact seals shall include-but not be restricted to-conventional labyrinth seals where motion through an interface volume takes a serpentine, curved, or labyrinthine path.

Laser shall include any active device that uses charged species to convert input energy into a narrow intense beam of phase-coherent light using stimulated emission, such as conventional laser diodes and VCSEL's (vertical cavity surface emitting lasers), and shall also be broadened in meaning to also include any light emitting device-regardless of any physical, chemical, or electronic light generating mechanisms used therein (such as conventional light emitting diodes or LED's)—that possesses the requisite coherence, divergence, isotropic uniformity, electromagnetic frequency distribution and capability of modulation to serve the purposes of this invention.

Light shall include electromagnetic radiation of any frequency, such as radio waves; microwave emissions; infrared, visible, and ultraviolet light; and modulated soft and hard x-rays, and gamma emission, such as might be used for space applications where a light emitting device that does not require input power may be required.

Light emitting device shall include a strobe as defined below, and any other device that emits electromagnetic waves of any frequency in any manner. This shall include, for example, photoflash units, laser emitting diodes and lamps, with or without mechanical or other means, such as shutters or switchable optical filters, for modulating a time profile of emission.

Markable position shall refer to any means by which a location on a tape can be used to position a detector for position marking or setting, or spatial data accumulation, including the use of physical detents, indexing, alignment marks or tabs, bosses, holes, hubs, or the use of magnetic or other distinguishing materials on or about the tape surface.

Necessary path shall denote the path that a contaminant must take in traversing a route, path or interface volume.

Pose shall refer to spatial translations, rotations, orientations and manipulations (e.g., unfolding or unreeling) to affect a desired result.

Positioning shall include position measurement in a field of measurement; data acquisition of position information, including map generation, establishing lines, curves, and planes; setting points; and determining or tracking the position of any moveable object, whether by explicit determination of position as a function of time or other parameter, or by providing simple increments or differentials to provide a similar result.

Processor shall include not only all processors, such as CPU's (Central Processing Units), but also any intelligent device that performs the functions given, such as analog electrical circuits that perform the same functions. In the appended claims, the word processor can include any processor in the receiver and/or any processor in the transmitter.

Receiver shall include any device that receives and processes spatial position-specific information from a transmitter.

Reelable shall include the term foldable, and shall also include any other qualities of a material body (e.g., tape) that allow it to serve as a field-deployable length standard capable of being stowed or made more compact for storage, carrying, or additional deployment. The terms unreeling and unreeled shall be interpreted in a similarly broad manner.

Rotating laser head shall not require the use of a laser, and shall refer to any rotating body or rotor that serves to pan, scan, disseminate, array, divide, disperse, scatter, broadcast or distribute the output radiation of any light emitting device used for the purposes of this invention.

Serpentine shall include any labyrinthine or curved path that involves angular deviation or turning along that path, including a necessary path, where the path length is longer than a straight path.

Spring bias shall include any biasing mechanism, whether mechanical, electrical, electromechanical, or of any other type, which provides a force as a function of deviation from an equilibrium position.

Strobe shall include any and all light emitting devices that are used as a synchronization method serving the purposes of this invention, such as establishing datum lines or vectors, facilitate transmitter-receiver communications, or interfacing with peripheral devices used in conjunction with this invention.

Tape shall include strings, cables, wires, polymer extrusions, strands, threads, ropes, filaments or any medium or material body that is capable of being posed linearly or in any other manner (e.g., arcuate) to serve the spatial position-marking, setting, calibrating or referencing purposes of this invention.

Transmitter shall include any device that broadcasts spatial position-specific information to a receiver.

DETAILED DESCRIPTION OF THE INVENTION

Referring to FIG. 1 a cross sectional schematic view of a transmitter 10 according to the invention is shown. Transmitter base 12 is bolted to an upper housing 14 which together enclose and support many active components, including a rotating laser head 16 as shown. Inside rotating laser head 16 there are installed one or more laser diodes 18 or any other light emitting devices for generating a fanned laser beam 20 as shown and discussed above. To condition the output of laser diode(s) 18, a number of elements are used in a known manner, including passing the resultant light through a collimation lens 22, rod lens 24, and passage through a hermetically sealed exit window 26 as shown.

The entire rotating laser head 16 is supported and rotated at a constant known angular speed via spindle shaft 28. Spindle shaft 28 is driven in a precise manner by a known encoder motor 30, which resides inside spindle assembly 32, and is bearingly supported inside the spindle assembly 32 using shaft bearings 34. Set inside spindle assembly 32 is at least one, but preferably a plurality (for better distribution and reliability) of strobes 36 used for azimuth synchronization as discussed herein. As shown, the spindle assembly 32 further includes a strobe window 38. Transmitter base 12 includes a battery set 40 and a plumb-down laser assembly 42 and associated exit window 44 which are used in a known manner to set the transmitter 10 at a known spot or location on the site or field of measurement. Transmitter base 12 also includes a handle 46, keypad 48, and control electronics 50.

The spindle assembly 32 assembly as a whole is moveable on base-mounted gimbal pivots 52, with only one such gimbal pivot 52 shown, so as to provide two tiltable degrees of freedom for leveling purposes. As is known in the art, each such gimbal pivot 52 also has provision for tilting the spindle assembly 32 using a gimbal motor assembly 54, with only one such motor shown. Feedback is provided in a known manner by three single axis level sensors 56 (one shown), which serve to report to the control electronics 50 the angular position or tilt of the spindle assembly 32 and associated rotating laser head 16. Such single axis level sensors 56 can be fabricated using known electrolytic vials which are themselves calibrated independently prior to manufacture.

Encoder motor 30 has a known rotary encoder, such as a disc with holes and an optical monitor device (not shown) to generate pulses so the control electronics 50 can regulate the motor speed, and in turn, regulate the azimuthal angular rotation rate of the fanned laser beam(s) 20 that are relied upon to generate positioning information.

At the point where the rotating laser head 16 and the spindle assembly 32 are almost touching, there is provided a rotary transformer 58, which provides power to the rotating laser head 16 in a known manner using common inductively methods, such as used in a four-head consumer VCR. Just outboard of the rotary transformer 58 as shown is a labyrinth seal 60, which will be discussed in detail below.

Figure 2:
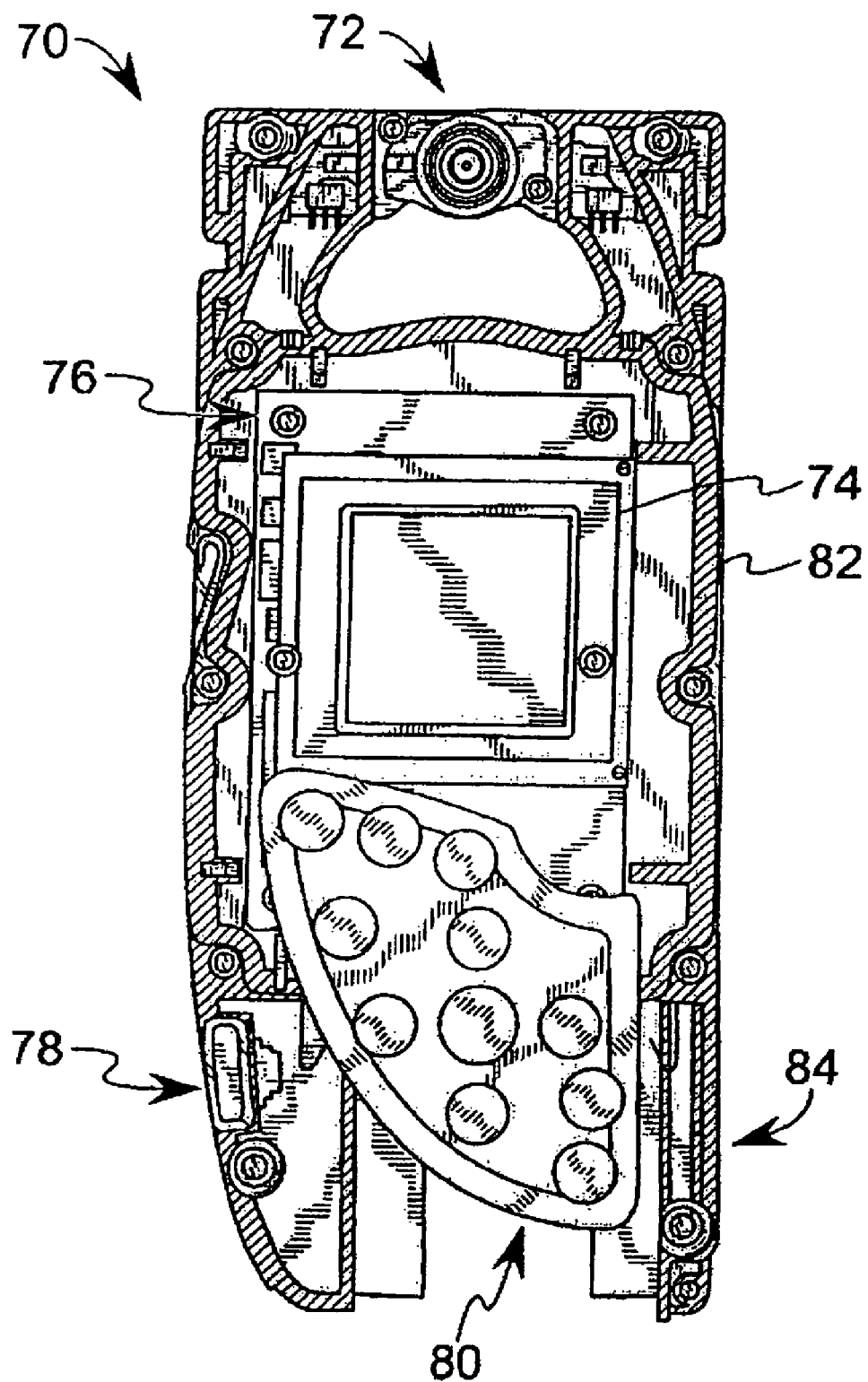
FIG. 2 shows a top view of a receiver according to an embodiment of the invention where the top housing and battery pack are removed to illustrate internal layout of certain components of the receiver.

Now referring to FIG. 2, a cross sectional schematic view of a receiver 70 according to the invention is shown. As envisioned in the discussion above, the receiver 70 shown comprises a detector 72, which incorporates a known photosensitive device, such as an eight-sided device that has eight photocells wired in parallel so that receipt of a laser fan beam or strobe emission by the transmitter 10 of FIG. 1 can be recorded over a wide possible range of entry angles from the field of measurement. Detector 72 can comprises separate detectors tailored for optimal reception of laser fan beam(s) and strobe emissions. For example, a detector 72 designed for optimal detection of a strobe emission could have a larger collection aperture to allow better signal to noise ratios, especially since the strobe emission falls as inverse square of the distance, while the laser fan beam(s) fall of as the inverse of the distance, as is known in the art. The receiver 70 as shown also includes an LCD (liquid crystal display) module 74, a circuit board 76 for receiver electronics, and one or more connectors 78 for known use with a detector wand, including such a wand comprising two detectors a known distance apart, akin to the "stadia" measurement mentioned above. The receiver 70 can also comprise a user keypad 80, and the housing 82 of the receiver 70 as shown can also accommodate a battery set 84 and include mounting provisions (not shown) for the field-deployable length standard discussed in the figures below.

Figure 3:
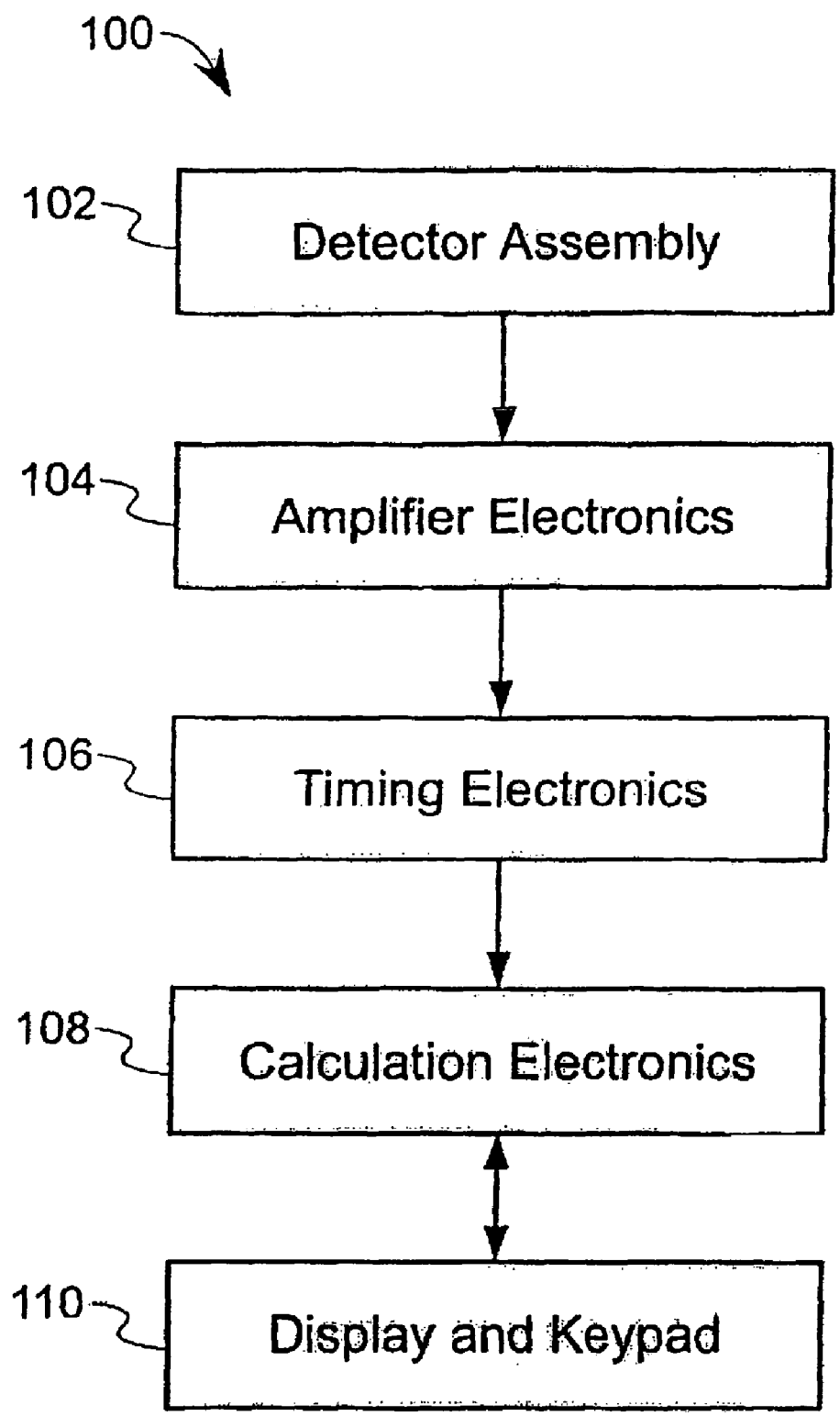
FIG. 3 shows a schematic block diagram for the receiver according to an embodiment of the invention.

Now referring to FIG. 3, a schematic block diagram 100 of possible controls for the receiver 70 according to the invention is shown. Many possible schemes can be used to control the receiver 70, but generally, as known in the art, and discussed in the above-referenced U.S. patents, the signal path can start as shown with a DETECTOR ASSEMBLY 102 where the light pulses are encoded or converted to electrical or electro-optic pulses which are conditioned by the AMPLIFIER ELECTRONICS 104 for use by TIMING ELECTRONICS 106 which interpret the temporal spacing of the pulses as alluded to above. CALCULATION ELECTRONICS 108 then use this information to generate coordinates as needed. User interfacing with this information is achieved via a DISPLAY AND KEYPAD 110 as shown. Processors, including microprocessors with on board memory, cache, and BIOS (basic input/output system) can accomplish this function according to software executable instructions as known in the art.

Figure 4:
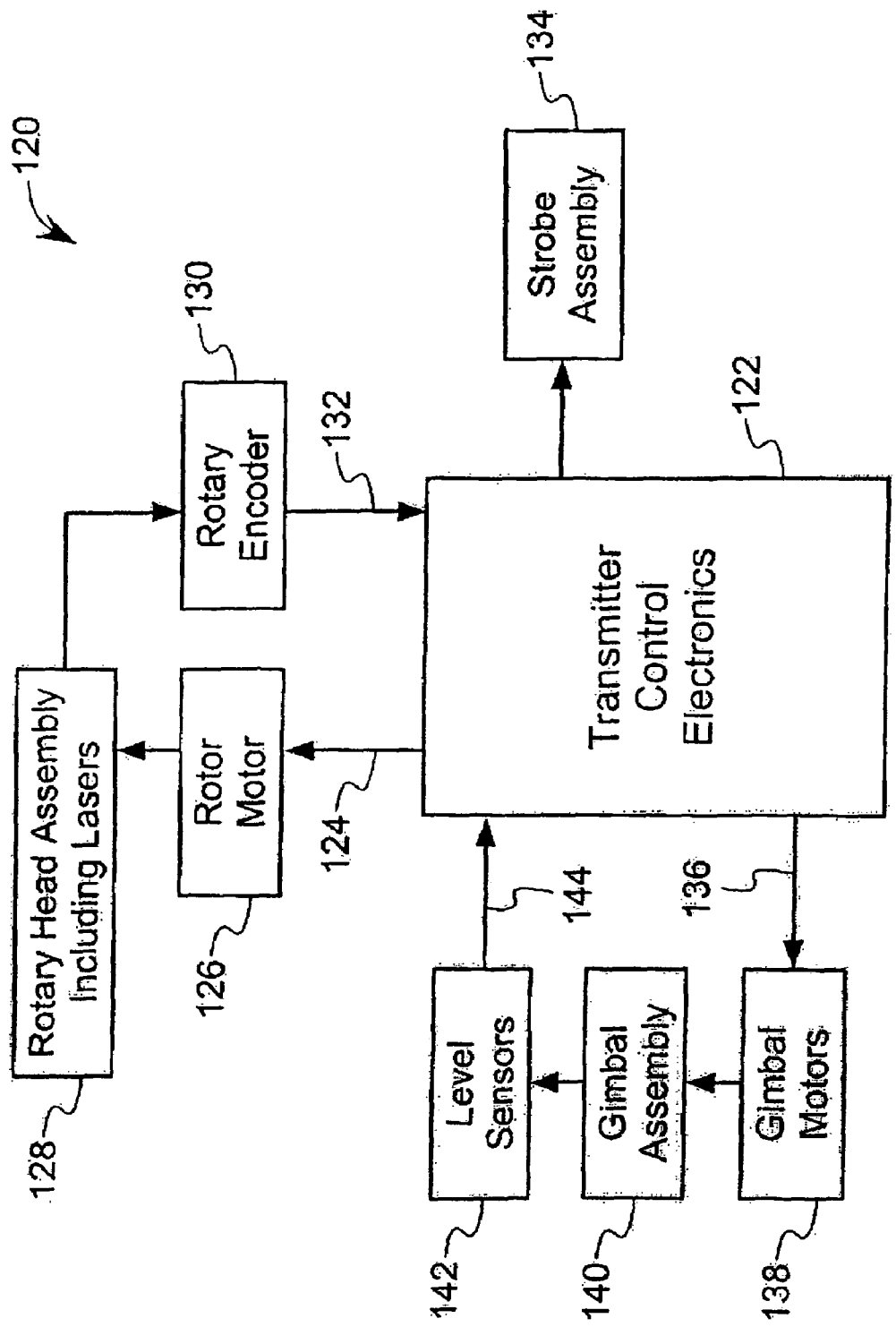
FIG. 4 shows a schematic block diagram for the transmitter according to an embodiment of the invention.

Now referring to FIG. 4, a schematic block diagram 120 of possible controls for the transmitter 10 according to the invention is shown. TRANSMITTER CONTROL ELECTRONICS 122 as shown provide functionality to perform transmitter functions, including a MOTOR DRIVE input 124 to the ROTOR MOTOR 126 which drives the rotating laser head which in turn, via the ROTARY ENCODER 130 gives SPEED FEEDBACK 132 to the TRANSMITTER CONTROL ELECTRONICS 122. TRANSMITTER CONTROL ELECTRONICS 122, comprising one or more processors, provides selective energizing of one or light emitting devices, shown here as STROBE ASSEMBLY 134. TRANSMITTER CONTROL ELECTRONICS 122 also function to provide a GIMBAL MOTOR DRIVE 136 to the GIMBAL MOTORS 138 as shown, which in turn mechanically influence the GIMBAL ASSEMBLY 140, causing three LEVEL SENSORS 142 to alter their LEVEL FEEDBACK 144 in a known manner as shown. This information is used in a known feedback loop to control the tilt or leveling of the rotating laser head.

The scale reference mentioned above is provided for by use of a field-deployable length standard, such as a "setup cable" or similar material body which will be discussed here. The setup cable is a retractable cable that is integrated into a stadia pole receiver mount or similar assembly. In one embodiment, the user to attaches the end of the cable to a fixed object, pulls the cable out several inches to a first detent, applies tension, and takes a measurement. Then the user releases the cable lock and backs up with the receiver 70 until the cable reaches a second detent, which is exactly 10 m from the first.

Figure 5:
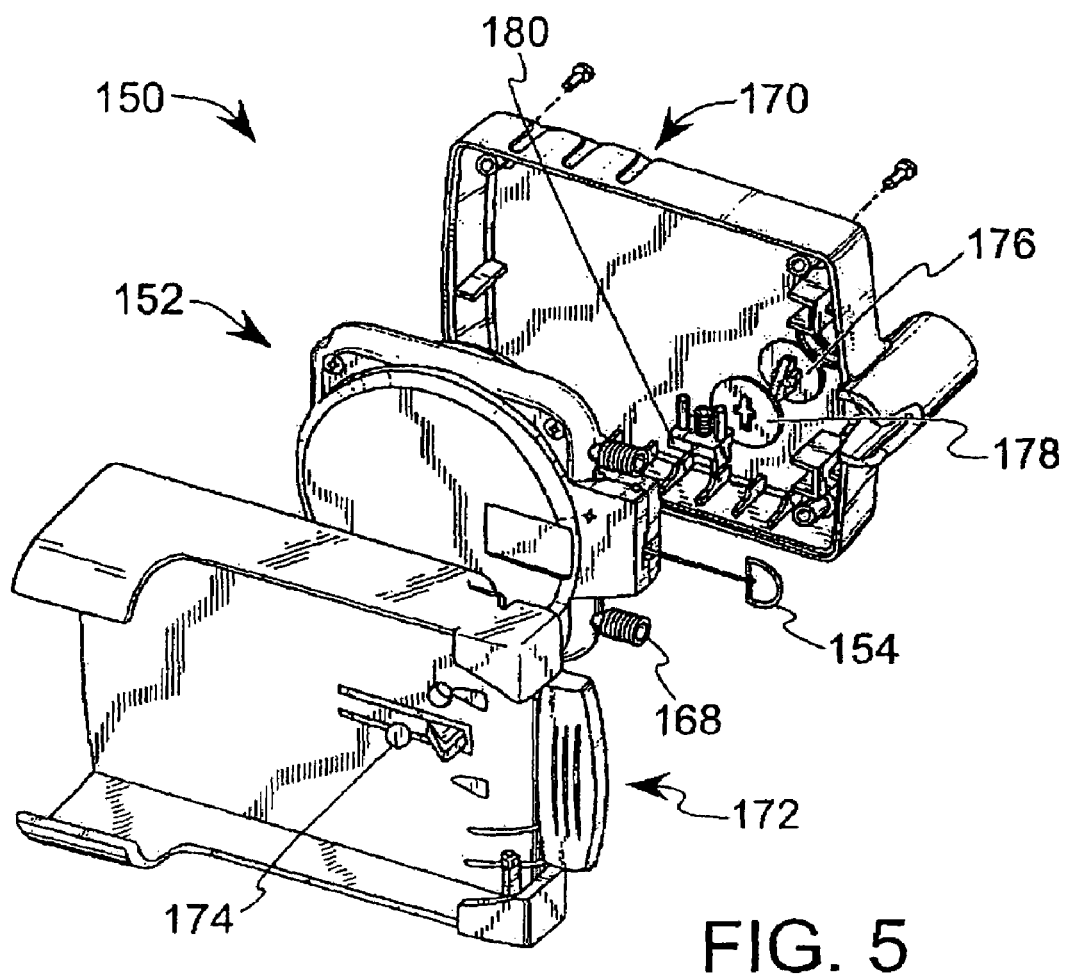
FIG. 5 shows an oblique exploded view of a stadia mount assembly which is part of a field-deployable length standard for the receiver according to an embodiment of the invention.
Figure 6:
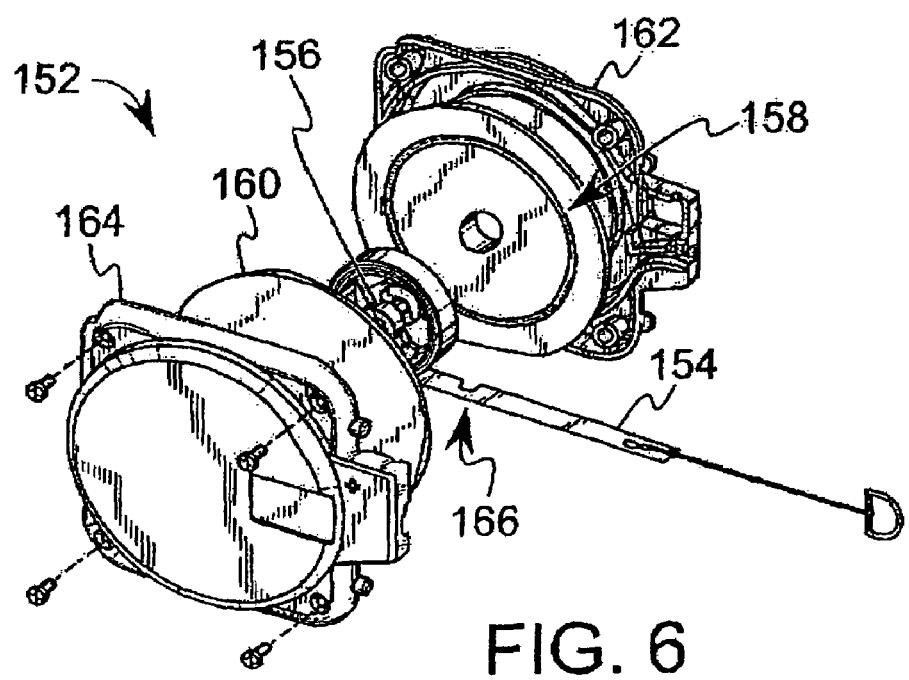
FIG. 6 shows an oblique exploded view of a spring assembly which is part of a field-deployable length standard for the receiver according to an embodiment of the invention.

Referring now to FIGS. 5 and 6, oblique exploded views of a possible stadia mount assembly 150 and spring assembly 152, respectively, which are part of a field-deployable length standard for the receiver according to the invention are shown. These two figures show variants of what is envisioned as part of the invention. The field-deployable length standard can be mounted directly on, or made integral with, the receiver as previously described. Referring initially to FIG. 6, inside the field-deployable length standard, a reelable tape or spring tape 154 is reeled upon a center hub 156, both residing in an inside reel, shown as portions or views inside reel left 158 and inside reel right 160. The inside reel 158, 160 is in turn housed inside an inner reel 162, 164, which acts as a housing for the reelable tape or spring tape 154, and keeps the spring tape 154 reeled and deployable. The spring tape 154 comprises a markable position 166 that provides a way of setting a position of the receiver. As shown, the mark 166 is implemented as a detent, but any other mechanism or technique can be used consistent with the definition above for markable position.

Referring to FIG. 5, the inside reel floats under bias using spring 168 which is affixed to the inside reel as described. In practice, one deploys the reelable tape or spring tape 154 by posing or extending spring tape 154, which can be affixed to a known feature in the field of measurement, and taking a position reading using the receiver, while the tape is unreeled and the inside reel is positioned upon a markable position. A receiver position reading (not shown) taken at an original position of the spring tape 154 with respect to the inside reel can provide, with the position obtain from the markable position, a distance standard as envisioned. To keep the tension or force loading of the reelable tape constant from measurement to measurement, the position of the inside reel can be monitored using an aperture in a reel housing 170, 172, with or without use of a lens 174 as shown to allow better alignment of the inside reel with respect to the reel housing. The use of a detent as the markable position on the spring tape 154 can be facilitated by the use of a button 176 and button holder 178, as shown, which allow a spring pin 180 to engage or cause to engage that detent. In this way, a reproducible field-deployable length standard is provided that is compact and allows a fair degree of measurement reproducibility. Another embodiment is provided when the spring tape 154 comprises two markable positions, in which case the field-deployable length standard can be posed twice, with receiver position readings taken for each pose, thus providing a length standard as envisioned here.

Now referring to FIG. 7, a portion of the cross-sectional view of FIG. 1, showing use of a labyrinth seal is shown. One embodiment of this invention provides for use of a labyrinth seal 60 as shown, at or near the interface between the rotating laser head 16 and the spindle assembly 32, in lieu of felt, rubber, or other rotary seals which have the disadvantages as cited above. The transmitter 10 shown can also comprise a rotary transformer 58 as discussed above, and shown in the figure inboard of the labyrinth seal 60. Contaminants 62 are in the ambient environment around the transmitter 10, and entry of contaminants 62 in the general direction shown by the arrow 63 can potentially result in contamination of spindle shaft 28 and other critical components, resulting in opening up of tolerances and poor performance. The labyrinth seal 60 incorporates a serpentine path 64 along a necessary path that the contaminants 62 must take to enter critical areas. Such a labyrinth seal 60 can be a separate component pressed or installed into the rotating laser head 16 and spindle assembly 32, or can be formed therefrom by machining or other known processes.

Referring now to FIG. 8, a closer cross-sectional view of FIG. 7 is shown. An interface volume 66 as shown provides a narrow, serpentine necessary path for contaminants 62 and thereby slows entry into spindle shaft 28 and related areas. The serpentine nature of the necessary path breaks up laminar flow of contaminants 62 and provide sinks for accumulated contaminants 62 that would otherwise have an opportunity to enter in an undesirable manner. Referring now to FIG. 9, the left side portion of the cross-sectional view of FIG. 8 is shown, showing use of a labyrinth seal 60 and a rotary transformer 58 having separate inductive portions 58A and 58B as shown.

FIG. 10 shows a close view of the left side portion of the cross-sectional view of FIG. 9, but with non-serpentine labyrinth seals to illustrate two things: the rotary transformer 58 can itself be modified, machined, or formed to operate as a labyrinth seal 60, and the labyrinth seal 60 interface volume can be straight, that is, non-serpentine. Specifically, the labyrinth seal 60 can have a non-serpentine interface volume 68 and the rotary transformer 58 can have a non-serpentine interface volume 69, which individually (separately) or both (if both are made to be labyrinth seals) can serve to provide a discouraging necessary path for contaminants 62.

FIG. 11 shows an end-on surface view of the labyrinth seal 60 shown in FIG. 7, in a plane perpendicular to spindle shaft. The concentric rings 61 as shown are indicative of the serpentine nature of the necessary path for contaminants 62 as they start to migrate across this figure toward the center 65 as shown.

Figure 12:
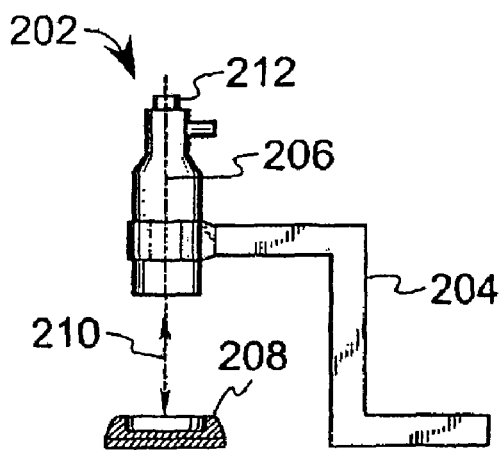
FIG. 12 shows leveling of the operating axis of an autocollimator.

Referring now to FIG. 12, a conventional leveling of the operating axis of an autocollimator 202, a known process by which an autocollimator 202 secured by an autocollimator foot 204 is leveled or plumbed to have its operating axis 206 as shown to be in alignment with the gravitational vector. The output of the autocollimator is set upon a mercury pool 208 and the autocollimator 202 is adjusted in position (notably, its operating axis 206) until the operating axis 206 of the autocollimator 202 becomes a desired axis 210, which in this case is determined by gravity. This is done in a known manner by adjusting autocollimator 202 and its operating axis 206 until the place where the reflected beam from mercury pool 208 hits a reticle 212 or functionally similar component or surface in the same projected location as the originating beam.

Figure 13:
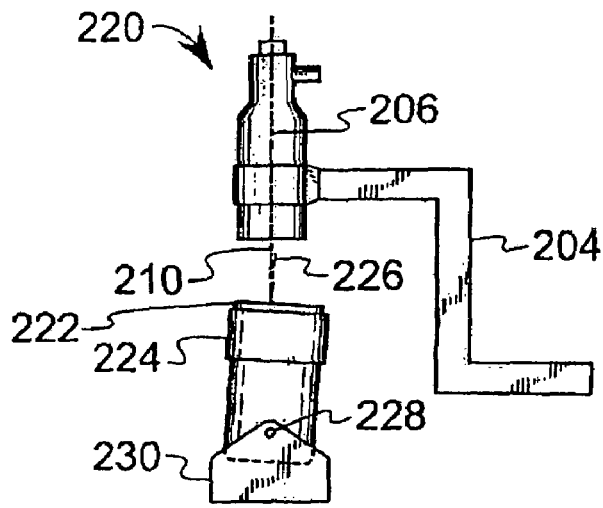
FIG. 13 shows a transmitter calibration technique for the present invention using a mirror affixed to a rotating laser head.

Now referring to FIG. 13, a transmitter calibration technique 220 is given for the present invention using a mirror 222 affixed to the rotating laser head 224 as shown. It does not matter whether the mirror 222 is flat on its underside, or whether it is not level with respect the rotating laser head 224. The mirror 222, once affixed to the rotating laser head 224, defines a rotor axis 226, which may or may not reflect well the rotation axis (not shown) of the rotating laser head 224. However, this generally will not affect the final result.

Presumably, the rotating laser head 224 needs calibration, and its rotation axis is not true or along a desired axis 226 as shown. For example, after the transmitter 10 levels itself, there may still be deviation about gimbal axis 228 and the rotating laser head 224 may be tilted with respect to the desired axis 226, with the positioning of the transmitter housing and components 230 taken into account. One places mirror 222 on the rotating laser head 224, and shines the light output of autocollimator 202 upon the mirror 222 with the rotating laser head 224 rotating in the normal manner. The resultant reflected light will give valuable and easily obtainable information.

Figure 14:
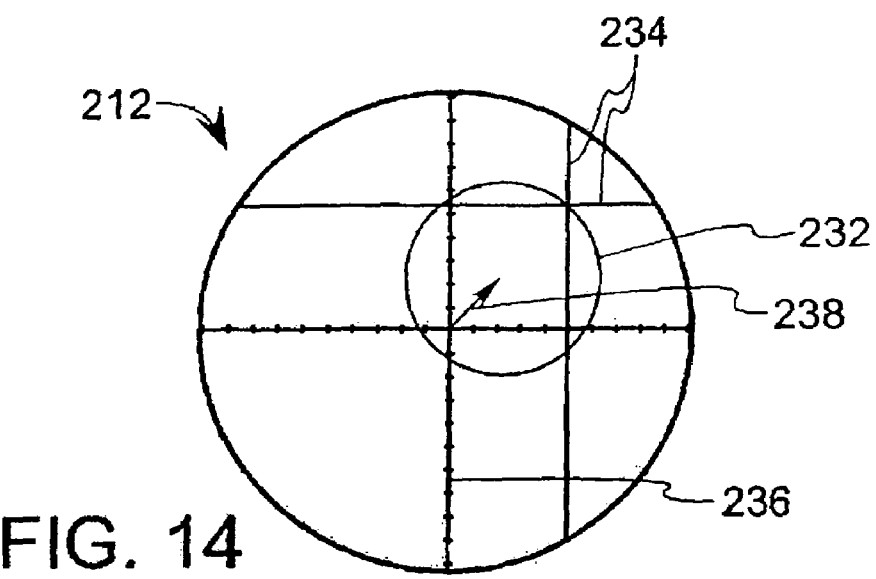
FIG. 14 shows a reticle inside the autocollimator of FIG. 12, illustrating the calibration technique of the present invention.

FIG. 14 shows a reticle 212 inside the autocollimator 202 of FIG. 12, illustrating the calibration technique of the present invention. The resultant reflected light forms a circle, circular arc or arc 232, which may be divined using the cross hairs 234 or the equivalent in the autocollimator 202, whose reticle 212 may have gradations or rulings 236 as shown. In this method, the magnitude and direction of the deviation of the center 238 of the arc 232 indicates precisely the misalignment of the rotor spin axis 226 (as shown in FIG. 13), and the transmitter can be appropriately calibrated to bring the center 238 of the arc 232 into alignment with the operating axis 210 of the autocollimator 202. The diameter of the arc 232 indicates the amount of wobble and this information can be discarded, as it is not relevant to the calibration of the rotating laser head spin axis with the desired axis.

Figure 15:
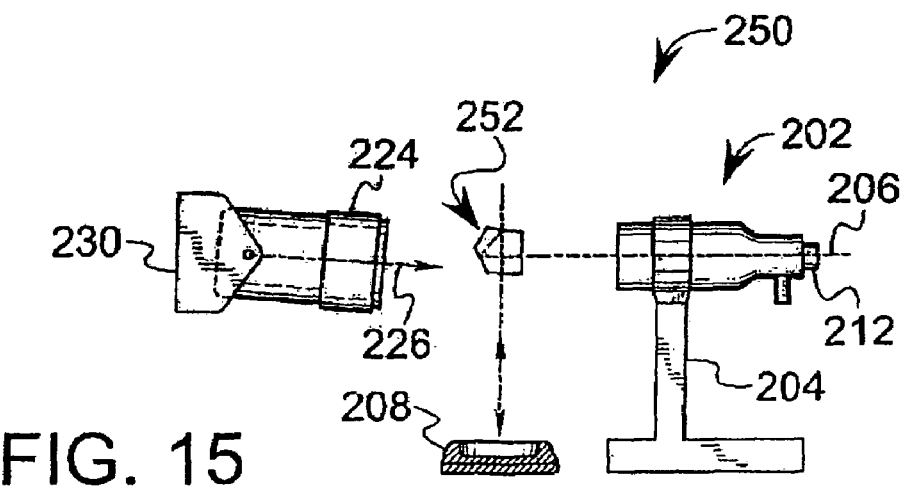
FIG. 15 shows a transmitter calibration technique similar to that shown in FIG. 13, but for a transmitter in a vertical mode.

FIG. 15 shows a transmitter calibration technique 250 similar to that shown in FIG. 13, but for a transmitter in vertical mode, where the operating axis 206 of the autocollimator 202 is set to a desired axis that is other than gravitational, e.g., horizontal. For this purpose the autocollimator 202 may be aligned using the known technique given, but this time using a pentaprism 252 or other device in conjunction with mercury pool 208, as is known.

Figures 16, 17:
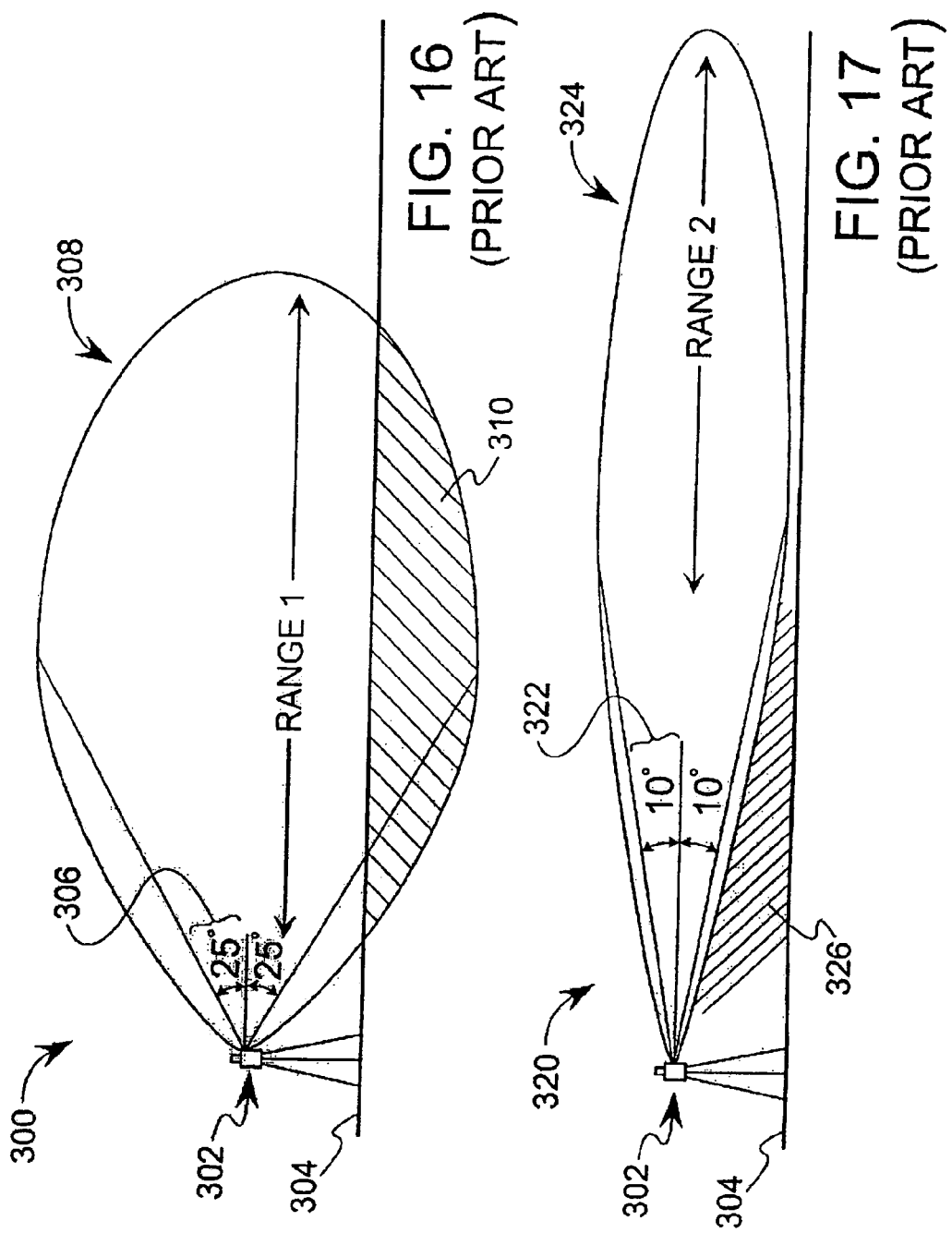
FIG. 16 shows a prior art configuration of strobe light emitting devices for azimuth synchronization.
FIG. 17 shows a longer range prior art configuration of strobe light emitting devices for azimuth synchronization.

FIG. 16 shows a prior art configuration 300 of strobe light emitting devices for azimuth synchronization, where a transmitter on a tripod 302 is set a ground plane 304 in a field of measurement and strobes are used to periodically light up the field using IREDs (infra-red emitting diodes) or other light emitting devices. The strobe devices shown here to illustrate have a half power beam angular width (HPBW) that is shown nominally at 25 degrees, resulting in a wide divergence 306 and a wide radiant intensity distribution 308. Such a distribution can be obtain using IRED devices under the tradename OPTEK290, for example. Radiant intensity distribution 308 results in a range (RANGE1) which is not long range enough from the transmitter, and results in wasted energy 310 which typically spills onto the ground surface.

In FIG. 17, a longer range prior art configuration 320 of strobe light emitting devices for azimuth synchronization is shown, with a narrow divergence 322 (using, for example, OPTEK295 IREDs), resulting in a narrow radiant intensity distribution 324, giving a long range RANGE2, but resulting in wasted energy 326, which actually is a lack of energy, and results in no appreciable strobe signal in the 326 area, limiting the fiduciary volume over which the spatial positioning system can function.

Figure 18:
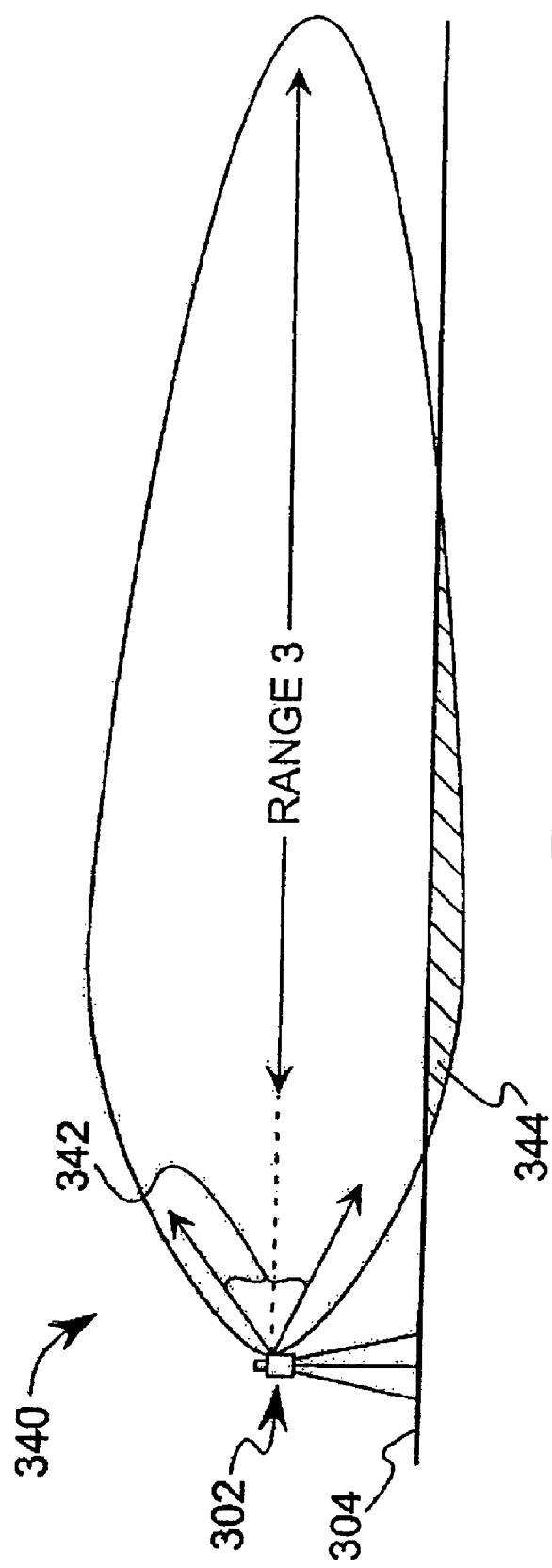
FIG. 18 shows a configuration of strobe light emitting devices for azimuth synchronization according to the present invention.

A solution is shown in FIG. 18, where a configuration 340 of strobe light emitting devices for azimuth synchronization according to the present invention is shown. One seeds the array of strobes with light emitting device of both narrow and wide divergence characteristics, namely, at least one wide divergence strobe providing a wide radiant intensity distribution, and at least one narrow divergence strobe providing a narrow radiant intensity distribution. The result, as shown, gives a mixed divergence characteristic 342, a long range RANGE3, and good coverage near the transmitter and minimal wasted energy 344. Of course, it is envisioned that many strobes can be used, and FIG. 19 shows a unfolded 360 degree view of the strobe light emitting devices arrayed about a transmitter according to the present invention.

Figure 19:
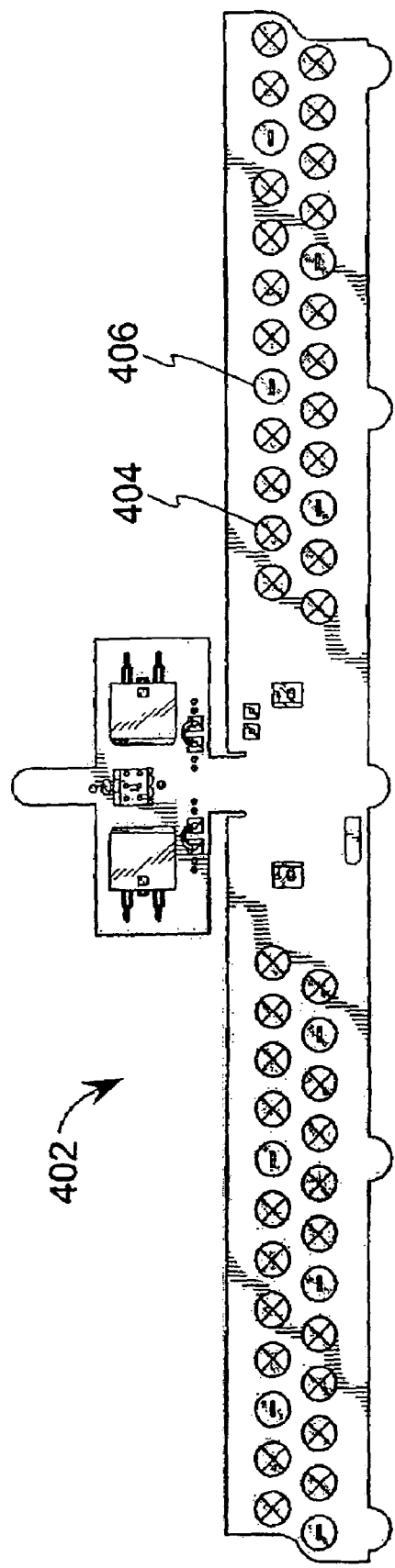
FIG. 19 shows a unfolded 360 degree view of the strobe light emitting devices arrayed about a transmitter according to an embodiment of the present invention.

Referring to FIG. 19, a strobe set 402 is shown, with the unfolded 360 degree view "flattened" into a strip S-STRIP for illustration purposes. In practice, the strobes are only arrayed about an angular field of 270 degrees, but this shall not be limiting in this disclosure. As shown, strobes having a narrow divergence distribution 404, shown with "X's" are placed throughout the array. Seeded among these devices, perhaps one for every three 404 strobes, are wide distribution strobes 406, as envisioned above and in the appended claims.

Figure 20:
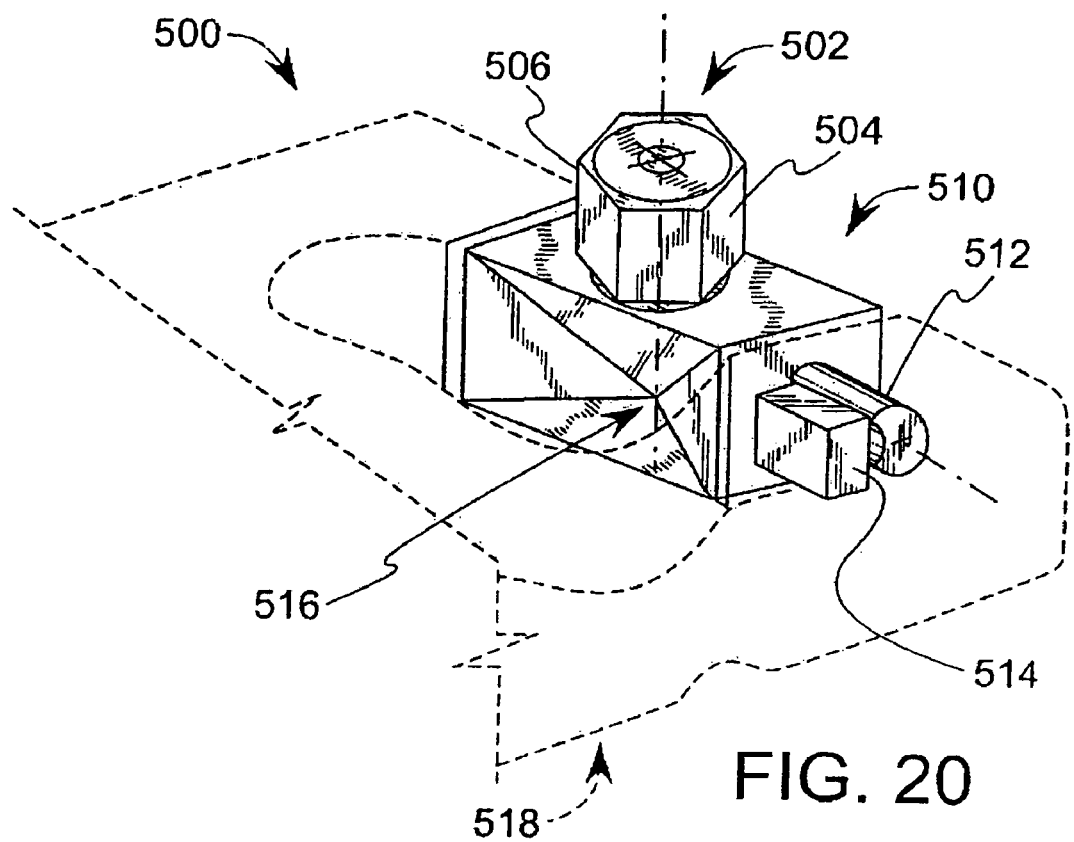
FIG. 20 shows the detector end of a receiver according to the present invention.

FIG. 20 shows the detector end of a receiver 500 according to the present invention, with a detector 502, photodiodes 504 arrayed inside the detector 502, covered by an infra-red transmissive cover 506. The detector 502 rides on a photocell base 510 which is articulatable by a pivot shaft 512. The pivot shaft may be part of the photocell base 510. The receiver 500 further includes a position sensing switch and detent 514, which indicates to the receiver electronics that the detector 502 has been flipped up as shown. The photocell base 510 can include a marking point as well known in the art. As shown, the transmitter 500 is housed in a receiver housing 518.

Figure 21:
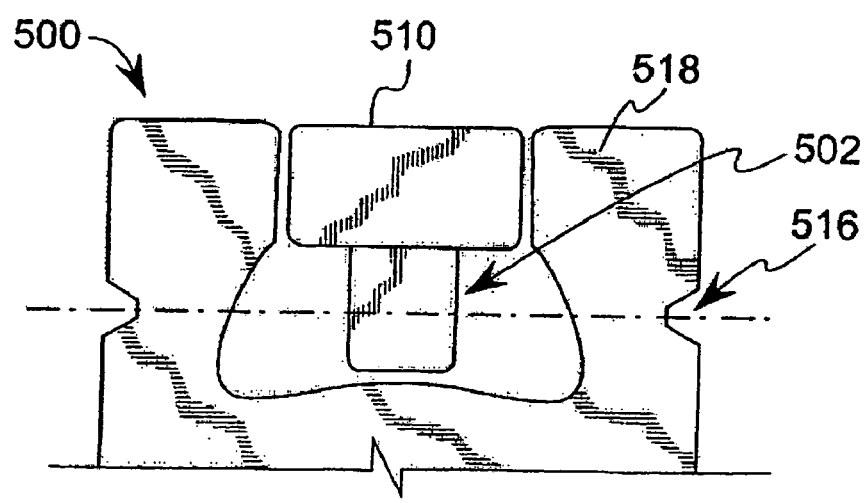
FIG. 21 shows the detector end of a receiver according to the present invention, when used with a transmitter in a vertical mode.

Now referring to FIG. 21, the detector end of a receiver 500 according to the present invention, when used with a transmitter in a vertical mode, is shown. In this mode, the receiver 500 is posed such that the detector 502 "views" the field of measurement horizontally, in anticipation of detecting laser fans that are rotating in a vertical plane, as is known. Photocell base 510 is flipped down into the receiver housing 518 for this purpose. Instead of prior art transmitters, where a transmitter must be dedicated to vertical scanning, the invention allows that the transmitter electronics and/or the receiver electronics are "informed" of a vertical positioning of the transmitter by known position sensors in the unit, and the spatial positioning system is used in conjunction with the receiver 500 thus described.

The fan sweep frequency for the vertical and horizontal modes can be different to allow differentiation by processors and calculation engines. Appropriate vertical vials can be provided and sensed at the appropriate time. By communicating the vertical mode (by virtue of position sensing, and not by elaborate setup methods or by dedication of units) directly to processors, automatic vertical mode position sensing in the field of measurement, even for tall buildings, can be obtained.

The setup cable described above obviates need for a "scale bar" to determine locations and give a scale to measurements already accumulated. In the case where there is no two-detector measurement wand or pole (stadia-type measurements), there is a need for quick field deployable means for easily setting scale. One can take numerous (redundant) measurements, which can then be averaged by processing algorithms. A "carpenter's" folding level is a possible embodiment for the posing of the field-deployable length standard.

Figure 22:
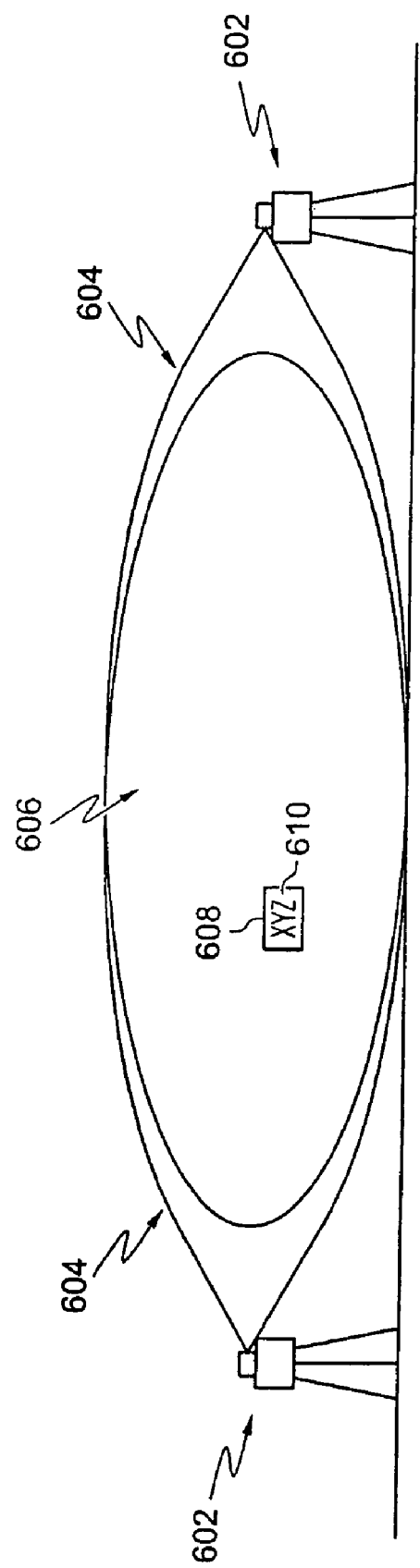
FIG. 22 shows two transmitters positioned in a work area, where a portion of the detection volume of each transmitter overlaps defining a field of measurement.

Typically, each laser transmitter scans light across a field extending 270 degrees horizontally and 60 degrees vertically. This scanning creates a detection or fiduciary volume over which the transmitter output may be detected by the receiver for position measurement. Referring to FIG. 22, two or more transmitters 602 can be positioned so that their detection volumes 604 overlap defining a field of measurement 606. In the field of measurement 606, a receiver 608 can determine up to three or more position variables 610, typically two spatial coordinates (e.g., azimuth, elevation) per twin beam laser transmitter 602.

All publications and references, including but not limited to patents and patent applications, cited in this specification are herein incorporated by reference in their entirety as if each individual publication or reference were specifically and individually indicated to be incorporated by reference herein as being fully set forth. Any patent application to which this application claims priority is also incorporated by reference herein in its entirety in the manner described above for publications and references.

The invention claimed is:

1. A spatial positioning system, comprising:
   a transmitter having:
      a rotating laser head adapted to emit light in the shape of a divergent rotating fan onto a field of measurement,
      a synchronization strobe adapted to provide a synchronization strobe beam in said field of measurement, said synchronization strobe including first strobes having first divergence characteristics, wherein said strobe beam has overall divergence characteristics different from said first divergence characteristics of said first strobes; and
      a sensor adapted to sense when said transmitter is oriented to sweep said divergent rotating light fan about a desired axis;
   a receiver, positioned in said field of measurement, having a detector to detect said divergent rotating light fan and said synchronization strobe beam; and
   a processor adapted to determine at least one spatial coordinate of said receiver based on the detection of said divergent rotating light fans and said synchronization strobe beam.

2. The spatial positioning system of claim 1, in which said transmitter changes the sweep frequency of said transmitter when said sensor senses that said transmitter is oriented to sweep said divergent rotating light fan is rotated about said desired axis.

3. The spatial positioning system according to claim 1, wherein said desired axis is a substantially vertical axis.

4. The spatial positioning system according to claim 1, wherein said desired axis may be adjusted.

5. The spatial positioning system according to claim 1, wherein said synchronization strobe further comprises second strobes having a second divergence characteristics, wherein said strobe beam has overall divergence characteristics different from said first divergence characteristics of said first strobes and said second divergence characteristics of said second strobes.

6. The spatial positioning system according to claim 5, wherein:
   said first strobes comprise narrow divergence characteristics;
   said second strobes comprise wide divergence characteristics; and said overall divergence characteristics comprises a mixture of narrow and wide divergence characteristics.

7. A spatial positioning system, comprising:
   a transmitter providing a continuously-rotating, diverging, fan-shaped beam of laser light, said beam being rotated about a vertical axis and diverging at an inclined angle to said axis of rotation, said beam continuously rotating across a field of measurement;
   said transmitter having:
      a synchronization strobe adapted to provide a synchronization strobe beam in said field of measurement, said synchronization strobe beam having a first radiant intensity distribution; and
      a sensor adapted to sense when said transmitter is oriented to sweep said divergent rotating light fan about said vertical axis, and communicate such orientation for a spatial coordinate determination;
   a receiver, positioned in said field of measurement, having a detector to detect said laser light and said synchronization strobe beam; and
   a processor adapted to determine at least one spatial coordinate of said detector in said receiver based on the detection of said laser light and said synchronization strobe beam.

8. A spatial positioning system comprising:
   at least two transmitters, each transmitter having:
      a rotating arrangement to emit light in the shape of a divergent rotating fan defining a detection volume;
      a synchronization strobe adapted to provide a synchronization strobe beam, said synchronization strobe including first strobes having a first divergence characteristic, and wherein said strobe beam has overall divergence characteristics different from said first divergence characteristics of said first strobes; and
      a sensor adapted to sense when said transmitter is oriented to sweep said divergent rotating light fan about a desired axis;
      wherein each of said at least two transmitters is positioned so that said detection volume of each transmitter at least partially overlaps, defining a field of measurement;
   a receiver positionable in said field of measurement having a detector to detect said divergent rotating light fan and said synchronization strobe beam from each transmitter; and
   a processor adapted to determine at least one spatial coordinate of said detector in said receiver based on the detection of said divergent rotating light fan and said synchronization strobe beam from said transmitters.

9. The spatial positioning system according to claim 8, wherein said processor determines azimuth and elevation from said at least two transmitters.

10. The spatial positioning system according to claim 8, wherein more than two position variables are determined based upon the detection of said divergent rotating light fan and said synchronization strobe beam from at least two transmitters.

11. The spatial positioning system according to claim 8, wherein two spatial coordinates are determined from each transmitter.

12. The spatial positioning system according to claim 11, wherein said two spatial coordinates comprise azimuth and elevation.

13. A spatial positioning system comprising:
   at least two transmitters, each transmitter configured to scan light across a field, defining a detection volume, said transmitters being positionable such that at least a portion of said detection volume of each transmitter overlaps defining a field of measurement wherein at least one position variable may be determined by said receiver; each transmitter further comprising:
   a synchronization strobe adapted to provide a synchronization strobe beam in said field of measurement, said synchronization strobe including first strobes having a first divergence characteristics, wherein said strobe beam has overall divergence characteristics different from said first divergence characteristics of said first strobes.

14. The spatial positioning system according to claim 13, wherein said receiver computes up to three position variables within said field of measurement.

* * * * *